United States Patent
Kundu et al.

(10) Patent No.: US 7,886,130 B2
(45) Date of Patent: *Feb. 8, 2011

(54) FIELD PROGRAMMABLE GATE ARRAY AND MICROCONTROLLER SYSTEM-ON-A-CHIP

(75) Inventors: Arunangshu Kundu, San Jose, CA (US); Arnold Goldfein, Sunnyvale, CA (US); William C. Plants, Sunnyvale, CA (US); David Hightower, Freemont, CA (US)

(73) Assignee: Actel Corporation, Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/345,409

(22) Filed: Dec. 29, 2008

(65) Prior Publication Data

US 2009/0106531 A1 Apr. 23, 2009

Related U.S. Application Data

(63) Continuation of application No. 11/187,068, filed on Jul. 22, 2005, now Pat. No. 7,516,303, which is a continuation of application No. 10/821,533, filed on Apr. 8, 2004, now Pat. No. 7,069,419, which is a continuation of application No. 09/654,237, filed on Sep. 2, 2000, now Pat. No. 6,751,723.

(51) Int. Cl.
G06F 15/00 (2006.01)
G06F 15/76 (2006.01)
(52) U.S. Cl. ............................ 712/37; 710/105; 710/315
(58) Field of Classification Search ................... 712/37
See application file for complete search history.

(56) References Cited

U.S. PATENT DOCUMENTS 4,688,248 A * 8/1987 Tomizawa .................... 380/211

(Continued)

FOREIGN PATENT DOCUMENTS

DE 19819505 A1 11/1999

(Continued)

OTHER PUBLICATIONS

Written Opinion of corresponding International Patent Application No. PCT/US01/27130 dated Nov. 15, 2004, 5 pages.

(Continued)

Primary Examiner—Eddie P Chan
Assistant Examiner—Corey Faherty
(74) Attorney, Agent, or Firm—Lewis and Roca LLP

(57) ABSTRACT

A system-on-a-chip integrated circuit has a field programmable gate array core having logic clusters, static random access memory modules, and routing resources, a field programmable gate array virtual component interface translator having inputs and outputs, wherein the inputs are connected to the field programmable gate array core, a microcontroller, a microcontroller virtual component interface translator having input and outputs, wherein the inputs are connected to the microcontroller, a system bus connected to the outputs of the field programmable gate array virtual component interface translator and also to the outputs of said microcontroller virtual component interface translator, and direct connections between the microcontroller and the routing resources of the field programmable gate array core.

9 Claims, 19 Drawing Sheets

U.S. PATENT DOCUMENTS

| | | | |
|---|---|---|---|
| 4,758,745 A | | 7/1988 | Elgamal et al. |
| 4,870,302 A | | 9/1989 | Freeman et al. |
| 5,162,988 A | | 11/1992 | Semerau et al. |
| 5,333,198 A | | 7/1994 | Houlberg et al. |
| 5,355,162 A | * | 10/1994 | Yazolino et al. ............ 725/116 |
| 5,625,651 A | * | 4/1997 | Cioffi .......................... 375/354 |
| 5,784,636 A | | 7/1998 | Rupp |
| 5,854,752 A | | 12/1998 | Agarwal |
| 5,896,414 A | * | 4/1999 | Meyer et al. ................. 375/222 |
| 5,915,123 A | | 6/1999 | Mirsky et al. |
| 5,960,191 A | | 9/1999 | Sample et al. |
| 5,970,254 A | | 10/1999 | Cooke et al. |
| 6,052,773 A | | 4/2000 | DeHon et al. |
| 6,188,381 B1 | | 2/2001 | Van der Wal |
| 6,226,735 B1 | | 5/2001 | Mirsky et al. |
| 6,553,479 B2 | | 4/2003 | Mirsky et al. |
| 6,751,723 B1 | * | 6/2004 | Kundu et al. ................... 712/36 |
| 6,970,966 B2 | * | 11/2005 | Gemelli et al. .............. 710/305 |
| 7,069,419 B2 | | 6/2006 | Kundu et al. |
| 7,231,459 B2 | * | 6/2007 | Saraph et al. ................ 709/241 |
| 7,516,303 B2 | | 4/2009 | Kundu et al. |
| 2001/0038642 A1 | | 11/2001 | Alvarez, II et al. |
| 2005/0257031 A1 | | 11/2005 | Kundu et al. |

FOREIGN PATENT DOCUMENTS

| | | | |
|---|---|---|---|
| EP | 0840455 A2 | | 5/1998 |
| EP | 0840455 A3 | | 11/2000 |
| JP | 00/22546 A2 | | 4/2000 |
| JP | 2004-523879 A | | 5/2004 |
| WO | 00/22546 A3 | | 4/2000 |
| WO | 02/21693 A2 | | 3/2002 |
| WO | 02/21693 A3 | | 3/2002 |

OTHER PUBLICATIONS

CY3650, CY3651 USB Developer's Kit Preliminary, Cypress Semiconductor Corporation, pp. 1 & 2, Oct. 1996—Revised Jul. 1997.

"Mit programierbarer Logik verheiratet", *Elektronik*, Francis Verlag GMBH, Munchen, DE, vol. 47, No. 7, p. 38, Mar. 31, 1998.

Integrated Quad UART and PCI interface, *OX16PCI954 Data Sheet Revision 1.3*, Oxford Semiconductor, pp. 1-72, Feb. 1999.

OX16PC1954 Intelligent QUAD Channel UART with PCI, *Oxford Semiconductor Product Catalog*, pp. 12-13, 1999 (no month).

"Inventra M8051 8-BIT Microcontroller", [Internet] www.mentor.com/inventra, Mentor Graphics, pp. 1 & 2, Oct. 1999.

"Inventra M8051 Warp 8-BIT Microcontroller", [Internet] www.mentor.com/inventra, Mentor Graphics, pp. 1 & 2, Jan. 2000.

AMBA™Specification, (Rev 2.0), ARM Limited, pp. 1—Index iv, 1999 (no month).

AMBA™ Overview, *ARM Processors and Peripherals*, ARM Limited, pp. 1 & 2, 2000 (no month).

Triscend E5 Configurable System-on-Chip Family, Triscend Corporation, 1-90, i-ii, 2000 (no month).

ANO7 Using Keil Development tools with Triscend FastChip and the E5 CsoC Family, Triscend Corporation, pp. 1-20, 2000 (no month).

CY7C64013, CY7C64113 Full-speed USB (12 Mbps) Function Preliminary, Cypress Semiconductor Corporation, pp. 1-2, Feb. 4, 2000.

Phil Harvey, "Triscend leads a hybrid chip charge", [Internet] Inside Tech column, *Red Herring*, pp. 1-3, Feb. 4, 2000.

Inventra™ M1284H-A1 Host Parallel Port, Datasheet, [Internet] www.mentor.com/inventra, Mentor Graphics, pp. 1 & 2, Jun. 2000.

Inventra™ M8051 E-Warp 8-Bit Microcontroller with On-Chip Debug, [Internet], www.mentor.com/inventra, Mentor Graphics, pp. 1 & 2, Jun. 2000.

Markus Levy, "Processors drive (or dive) into programmable-logic devices", *EDN*, pp. 107-108, 110, 112, 114, Jul. 20, 2000.

Field Marshal P200 Technology Overview, [Internet] http://www.tellima.co.uk/proj200view.htm, pp. 1-2, Jul. 26, 2000.

All about UART's [Internet] http://consumer.3com.com/modem/documents/10589.htm, 3Com Corp., pp. 1-2, Jul. 26, 2000.

\* cited by examiner

US 7,886,130 B2

FIELD PROGRAMMABLE GATE ARRAY AND MICROCONTROLLER SYSTEM-ON-A-CHIP

CROSS-REFERENCE TO RELATED APPLICATIONS

This application is a continuation of co-pending U.S. application Ser. No. 11/187,068, filed Jul. 22, 2005, which is a continuation of U.S. patent application Ser. No. 10/821,533, filed Apr. 8, 2004, now issued as U.S. Pat. No. 7,069,419, which is a continuation of U.S. patent application Ser. No. 09/654,237, filed Sep. 2, 2000, now U.S. Pat. No. 6,751,723, which are hereby incorporated by reference as if set forth herein.

BACKGROUND OF THE INVENTION

1. Field of the Invention

The present invention relates to system-on-a-chip architecture. More particularly, the present invention relates to a field programmable gate array and a microcontroller in a system-on-a-chip architecture.

2. The Background Art

An integrated circuit uses a network of metal interconnects between individual semiconductor components, which are patterned with standard photolithographic processes during wafer fabrication. Multiple levels of metallized patterns may be used to increase the flexibility of the interconnects.

It has long been recognized that a user-programmable interconnect technique would allow lower tooling costs, and faster delivery time. To such an end, field programmable gate array (FPGA) circuits were developed. An FPGA is an array of uncommitted gates with uncommitted wiring channels. To implement a particular circuit function, the circuit is mapped into the array and the wiring channels and appropriate connections are programmed to implement the necessary wiring connections that form the circuit function.

A gate array circuit can be programmed to implement virtually any set of functions. Input signals are processed by the programmed circuit to produce the desired set of outputs. Such inputs flow from the user's system, through input buffers, then through the circuit, and finally back out to the user's system via output buffers. Such buffers provide any or all of the following input/output (I/O) functions: voltage gain, current gain, level translation, delay, signal isolation, or hysteresis.

There are essentially two configurations of programmable circuit elements used to provide flexibility to the user for programming the FPGA. In the first configuration, example of which is disclosed by El Gamal, et al. in U.S. Pat. No. 4,758,745, the FPGA can be permanently programmed by the user. In the second configuration, an example of which is disclosed by Freeman in U.S. Pat. No. 4,870,302, the FPGA can be changeably programmed by the user.

An application-specific integrated circuit (ASIC), such as a microcontroller is a mask-programmable gate array offers higher functionality and performance and more efficient use of space than an FPGA which offers lower design costs and greater user flexibility. Also, an ASIC can implement any variety of I/O function and often at a higher speed than an FPGA. Other dedicated functional circuitry may also offer higher functionality and performance than its equivalent configured from FPGA components.

In a system-on-a-chip (SOC) with both an FPGA and an ASIC portion provides some portion of the advantages of both designs. Of major concern in designing an SOC is providing a suitable interface between the FPGA and ASIC portions. In order for the IC to perform its tasks properly, the FPGA and ASIC portions must be able to communicate effectively with each other.

BRIEF DESCRIPTION OF THE INVENTION

In the present invention, an FPGA core tile may be employed as a stand-alone FPGA, repeated in a rectangular array of core tiles, or included with other devices in a system-on-a-chip (SOC). The core tile includes a rectangular array of logic clusters, a column of random access memory (RAM) modules, and I/O clusters. Horizontal and vertical routing channels as well as clocking resources provide interconnection between the logic clusters, the RAM modules and the I/O clusters.

The horizontal routing resources include a horizontal routing channel, output routing tracks, and horizontal highway routing channels. The vertical routing resources include vertical routing channel and vertical highway routing channels. The horizontal routing channels and vertical routing channels each include sub-channels having various numbers of tracks, and are segmented with programmable elements at various lengths. Each of the horizontal and vertical highway routing channels spans the entire length of a core tile. The clocking resources include routed and hardwired clocks that run the width and length of a core tile, respectively.

The horizontal routing resources and routed clock pairs extend into the columns of I/O clusters and the RAM modules, and the vertical routing resources and hardwired clocks extend into the rows of I/O clusters. Each of the columns of I/O clusters and RAM modules have their own vertical routing resources and hardwired clocks, and each of the rows of I/O clusters have their own horizontal routing resources, routed clock. Included at the uppermost edge of the rows of logic clusters is a channel that includes a horizontal routing channel and a routed clock pair. Programmable connections are provided by programmable elements between the routing resources. Preferably, the programmable elements are antifuses.

The unit of segment length for the horizontal routing channel is one-half a column of logic clusters, and the tracks in the horizontal routing channel are segmented in a pattern that repeats itself in every column of logic clusters. The unit of segment length for the vertical routing channel is one row of logic clusters, and the tracks in the vertical routing channel are segmented in a pattern that repeats itself after every two rows of logic clusters.

A logic cluster includes logic modules, flip-flop modules, a buffer module, transmitter modules, and receiver modules. A logic module is a combinatorial logic unit and includes first, second, third and fourth multiplexers each having first and second data inputs, an output, and a select input. A FF module is sequential logic unit that includes a four-input multiplexer having first and second select inputs, first, second, and three two-input multiplexers having a single select input, and a D-type flip-flop. The buffer, transmitter and receiver modules include buffers that may be programmably connected routing resources.

The RAM blocks are dual ported for simultaneous read and write operations and may be configured as 128 36-bit wide words, 256 18-bit wide words, 512 9-bit wide words, 1K for 4-bit wide words, or 4K 1-bit wide words. The RAM blocks can be selected to include collision detection and parity generation and check, and may be synchronous or asynchronous.

An I/O cluster includes I/O modules, a buffer module, transmitter modules, and receiver modules. The I/O module includes a FIFO, an input flip-flop, an output flip-flop, and an enable flip-flop, and is coupled to an I/O pad by a boundary scan register module and input and output buffers. The I/O pad may be programmed with different options by an I/O options module. The input flip-flop, an output flip-flop, and an enable flip-flop include a four-input multiplexer, first, second and third two-input multiplexers and a D-type flip-flop.

A LVDS core can be employed to input and output signals between the I/O pads and a FIFO. The LVDS core includes circuits for receiving data, and circuits for transmitting data.

In another aspect of the present invention a system on a chip (SOC) architecture includes an FPGA core tile and associated virtual component interface (VCI) logic, a micro-controller and associated VCI logic, external interface circuits JTAG and UART and associated VCI logic and, respectively, and system/peripheral bus and bridge and associated VCI logic.

The VCI logic associated with various components is designed to translate the signals of each of the components with which they are associated into universal signals that form a standard protocol which is understood by the remaining components in the SOC. Communication of the signals from a first component to a second component requires that certain of the signals from the first component be first translated to universal signals by the VCI associated with the first component. These universal signals are the translated by the VCI associated by the second component to signals on which the second component normally operates. Others of the signals from a first component will be directly connected to the second component. When the system/peripheral bus is employed in the communication of translated signals from a first component to a second component using a bus, the communication may also require translation of the universal signals onto and off of the system/peripheral bus.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
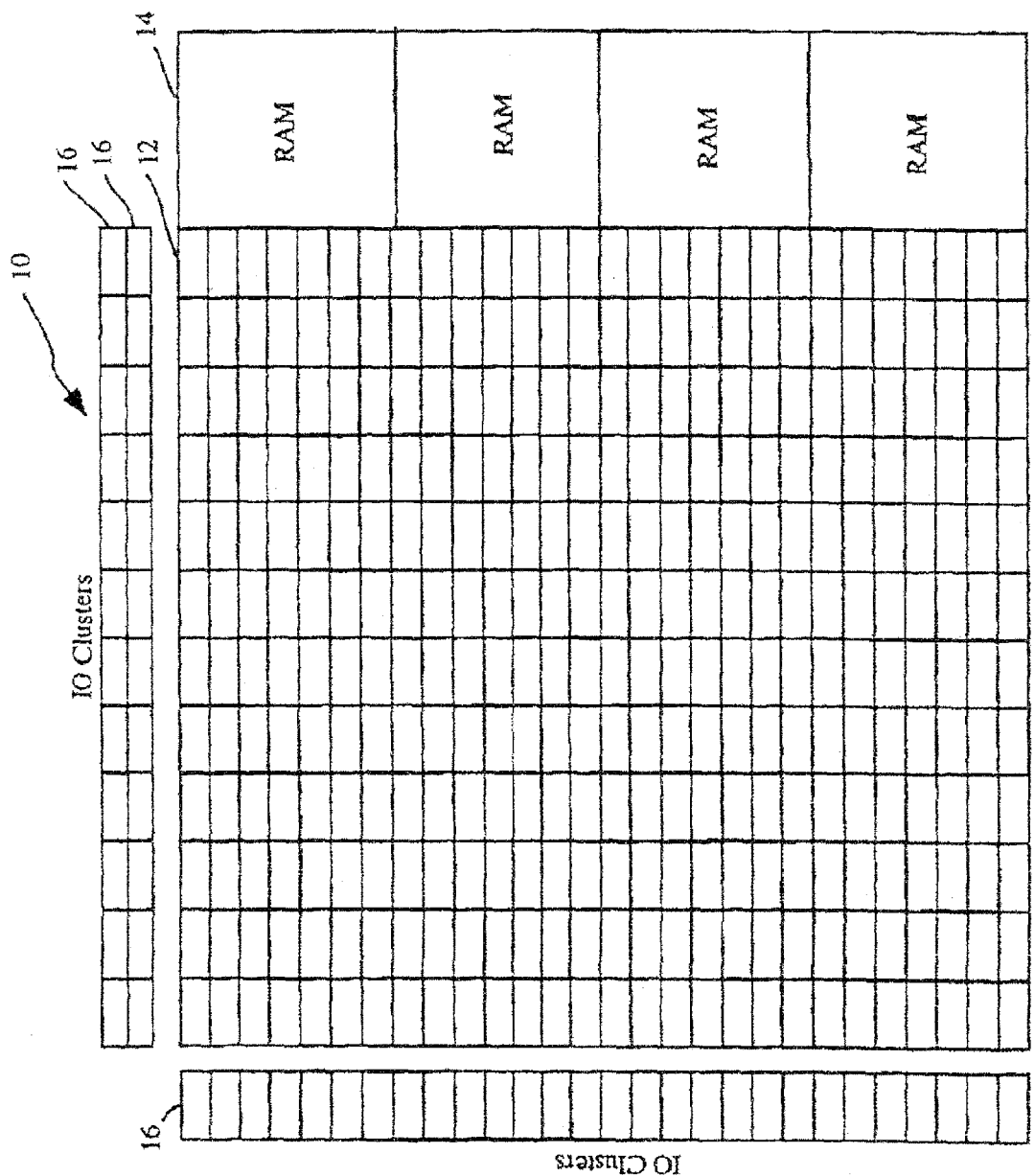
FIG. 1 illustrates a block diagram of an FPGA core tile according to the present invention.

FIG. 1 illustrates a block diagram of an FPGA core tile 10 that may be employed as a stand alone FPGA, repeated in a rectangular array of core tiles 10, or included with other devices in a system-on-a-chip (SOC) according to the present invention. The core tile 10 includes a rectangular array of logic clusters 12, a column of random access memory (RAM) modules 14, a column of I/O clusters 16 on the left side, a column of I/O clusters 16 on the right side (not depicted), first and second rows of I/O clusters 16 on the upper side of the rectangular array of logic clusters 12, and first and second rows of I/O clusters 16 on the lower side of the rectangular array of logic clusters 12 (not depicted). Horizontal and vertical routing channels as well as clocking resources not shown in FIG. 1, but discussed below are included in the FPGA core tile 10 to provide interconnection between the logic clusters 12, the RAM modules 14 and the I/O clusters 16.

Figure 2:
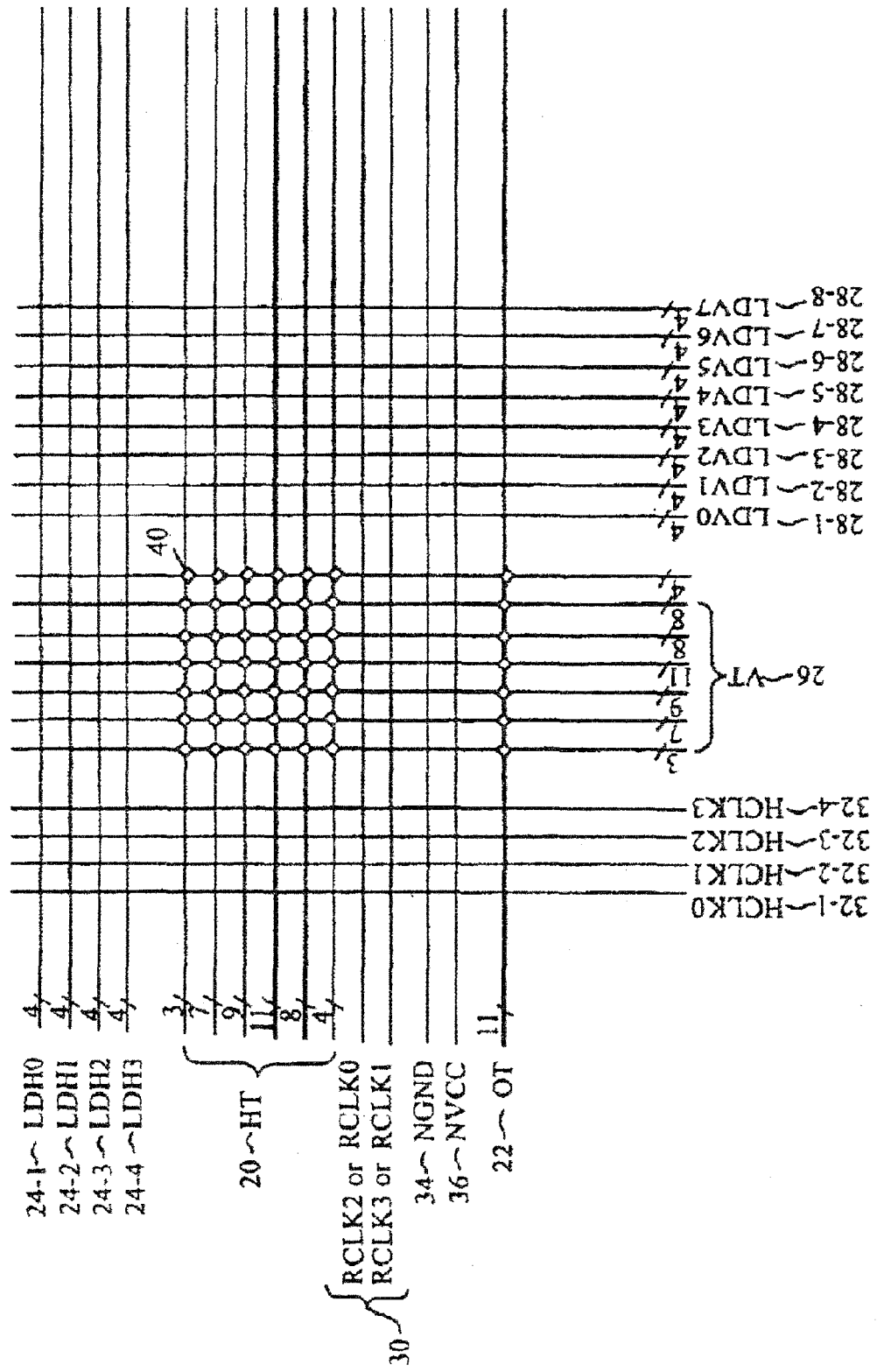
FIG. 2 illustrates horizontal and vertical routing resources, clock resources, and potentials that are provided to each row and column of logic clusters in an FPGA core tile according to the present invention.

FIG. 2 illustrates horizontal and vertical routing resources, clock resources, and potentials that are provided to each row and column of logic clusters 12 according to the present invention.

The horizontal routing resources include horizontal routing channel (HT) 20, output routing tracks (OT) 22, and first through fourth horizontal highway routing channels (LDH0-LDH3) 24-1 through 24-4, respectively. The vertical routing resources include vertical routing channel (VT) 26 and first through eighth vertical highway routing channels (LDV0-LDV7) 28-1 through 28-8, respectively.

The horizontal routing channels 20 and vertical routing channels 26 each include sub-channels having various numbers of tracks. The horizontal routing channel 20 has sub-channels having three, seven, nine, eleven, eight, and four tracks. The vertical routing channel 26 has sub-channels having three, seven, nine, eleven, eight, eight, and four tracks. The tracks in the sub-channels of both the horizontal routing channels 20 and vertical routing channels 26 are disposed across the width and the length of a core tile 10, and are segmented with programmable elements at various lengths in a manner depicted in FIGS. 3A and 3B. The output routing tracks 22 span the width of a logic cluster 12. Each of the four horizontal highway routing channels 24-1 through 24-4 spans the entire width of a core tile 10, and includes four tracks. Each of the eight vertical highway routing channels 28-1 through 28-8 spans the entire length of a core tile 10 and includes four tracks.

The clocking resources include a first and second routed clock which form a routed clock pair (RCLK0 and RCLK1 or RCLK2 and RCLK3) 30, and first through fourth hard wired clocks (HCLK0 through HCLK3) 32-1 through 32-4, respectively. The routed clock pairs 30 RCLK0/RCLK1 and RCLK2/RCLK3 are associated with alternating rows of logic clusters 12, however, each of the rows of logic clusters 12 have access to both the routed clock pair 30 with which it associated and the routed clock pair 30 associated with the row of logic clusters 12 directly above. The routed clocks pairs 30 and hardwired clocks 32-1 through 32-4 run the width and length of a core tile 10, respectively.

The potentials include ground (NGND) 34 and Vcc (NVCC) 36 which run the width of a core tile.

The horizontal routing resources 20, 22, and 24, routed clock pairs 30, and potentials 34 and 36 extend into the columns of I/O clusters 16 and the RAM modules 14, and the vertical routing resources 26 and 28 and hardwired clocks 32 channels extend into the rows of I/O clusters 16. Each of the columns of I/O clusters 16 and RAM modules 14 have their own vertical routing resources 26 and 28 and hardwired clocks 32, and each of the rows of I/O clusters 16 have their own horizontal routing resources 20, 22, and 24, routed clock pairs 30, and potentials 34 and 36. Included at the uppermost edge of the rows of logic clusters 12 is a channel that includes a horizontal routing channel 20, a routed clock pair 30, and potentials 34 and 36.

Disposed at the intersection of the horizontal routing channel 20 and the output routing tracks 22 with the vertical routing channel 26 are programmable elements, depicted as open circles, one of which is indicated by the reference numeral 40. The programmable elements 40 may be any of several types of programmable elements, many of which are well known to those of ordinary skill in the art including antifuses, pass transistors, SRAM cells, EEPROM elements or cells, and Flash elements or cells. Preferably, the programmable elements are antifuses. Antifuses are well known to those of ordinary skill in the art, and accordingly will not be further described herein to avoid overcomplicating the disclosure and thereby obscure the present invention. For consistency throughout this disclosure, programmable elements will be indicated by the reference numeral 40.

Figure 3A:
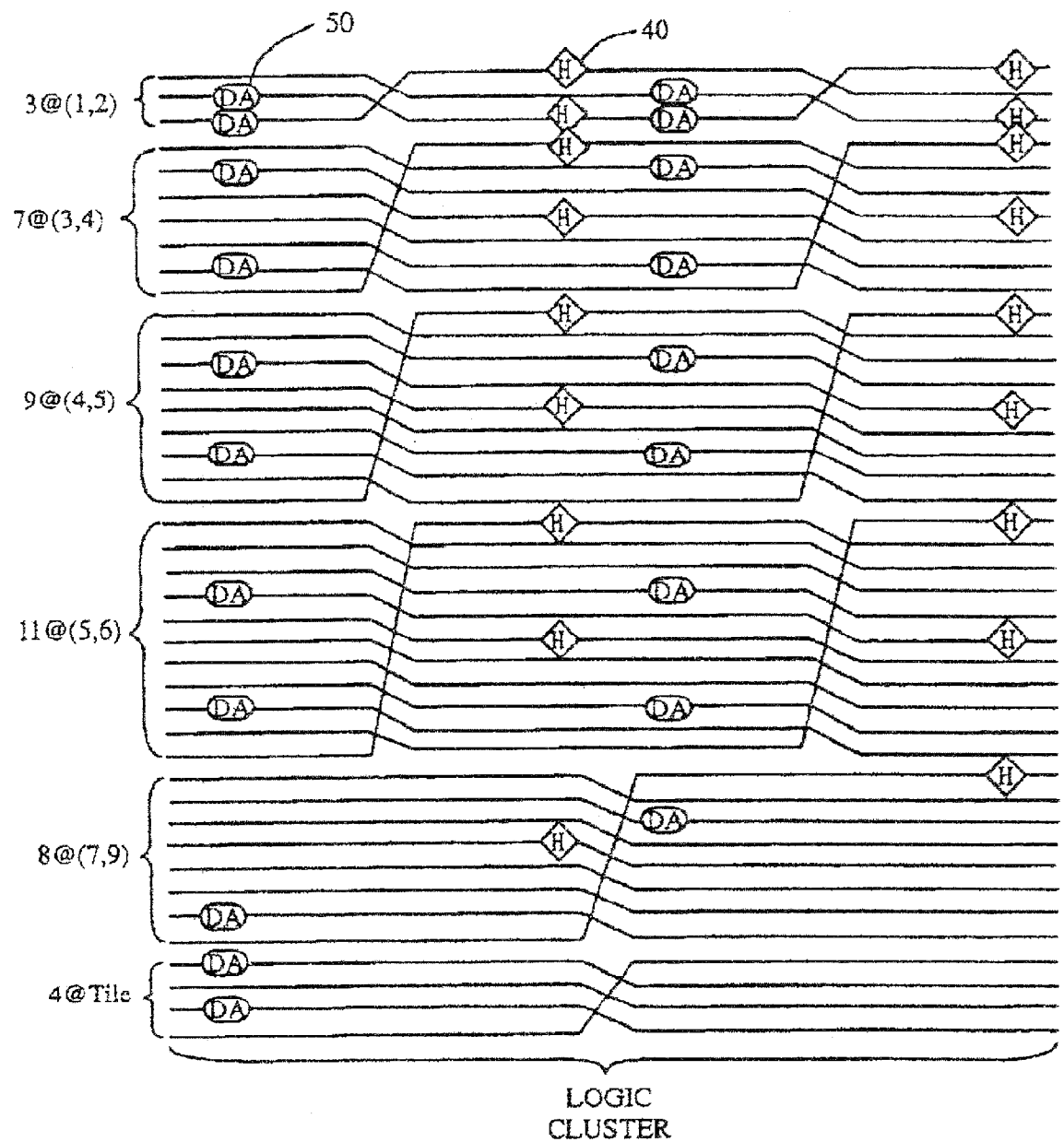
FIG. 3A illustrates the segmentation of the tracks in the sub-channels of the horizontal routing channels in an FPGA core tile according to the present invention.
Figure 3B:
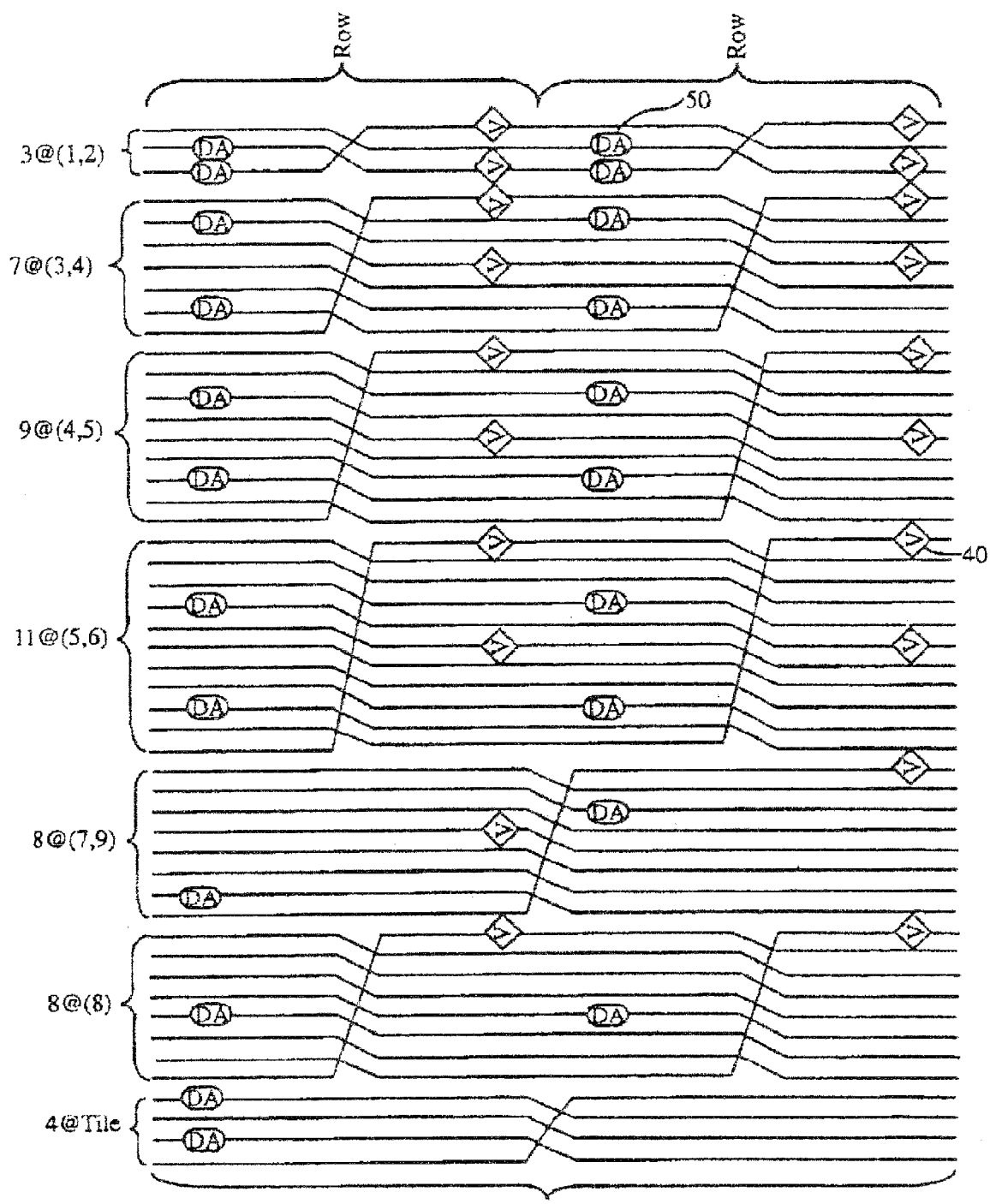
FIG. 3B illustrates the segmentation of the tracks in the sub-channels of the vertical routing channels in an FPGA core tile according to the present invention.

FIGS. 3A and 3B illustrate the segmentation of the tracks in the sub-channels of the horizontal and vertical routing channels 20 and 26 according to the present invention. The unit of segment length for the horizontal routing channel 20 is one-half a column of logic clusters 12, and the tracks in the horizontal routing channel 20 are segmented in a pattern that repeats itself in every column of logic clusters 12. The unit of segment length for the vertical routing channel 20 is one row of logic clusters 12, and the tracks in the vertical routing channel 26 are segmented in a pattern that repeats itself after every two rows of logic clusters 12. Programmable elements 40 are employed to segment the tracks in the horizontal and vertical routing channels 20 and 26, respectively. The direct address (DA) elements, one of which is indicated by the reference numeral 50 in both FIGS. 3A and 3B are programming devices employed to program an antifuse as the preferred programmable element 40.

Figure 4:
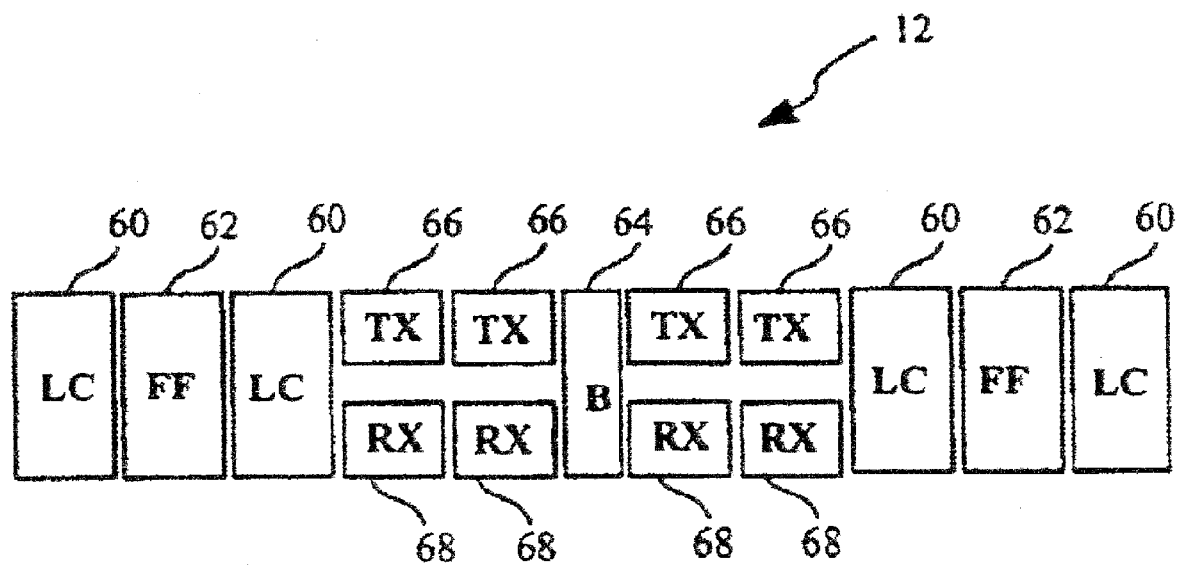
FIG. 4 illustrates a block diagram of a logic cluster according to the present invention.

FIG. 4 illustrates a block diagram of a logic cluster 12 according to the present invention. Each logic cluster 12 includes four logic (LC) modules 60, two flip-flop (FF) modules 62, one buffer (B) module 64, four transmitter (TX) modules 66, and four receiver (RX) modules 68.

Figure 5:
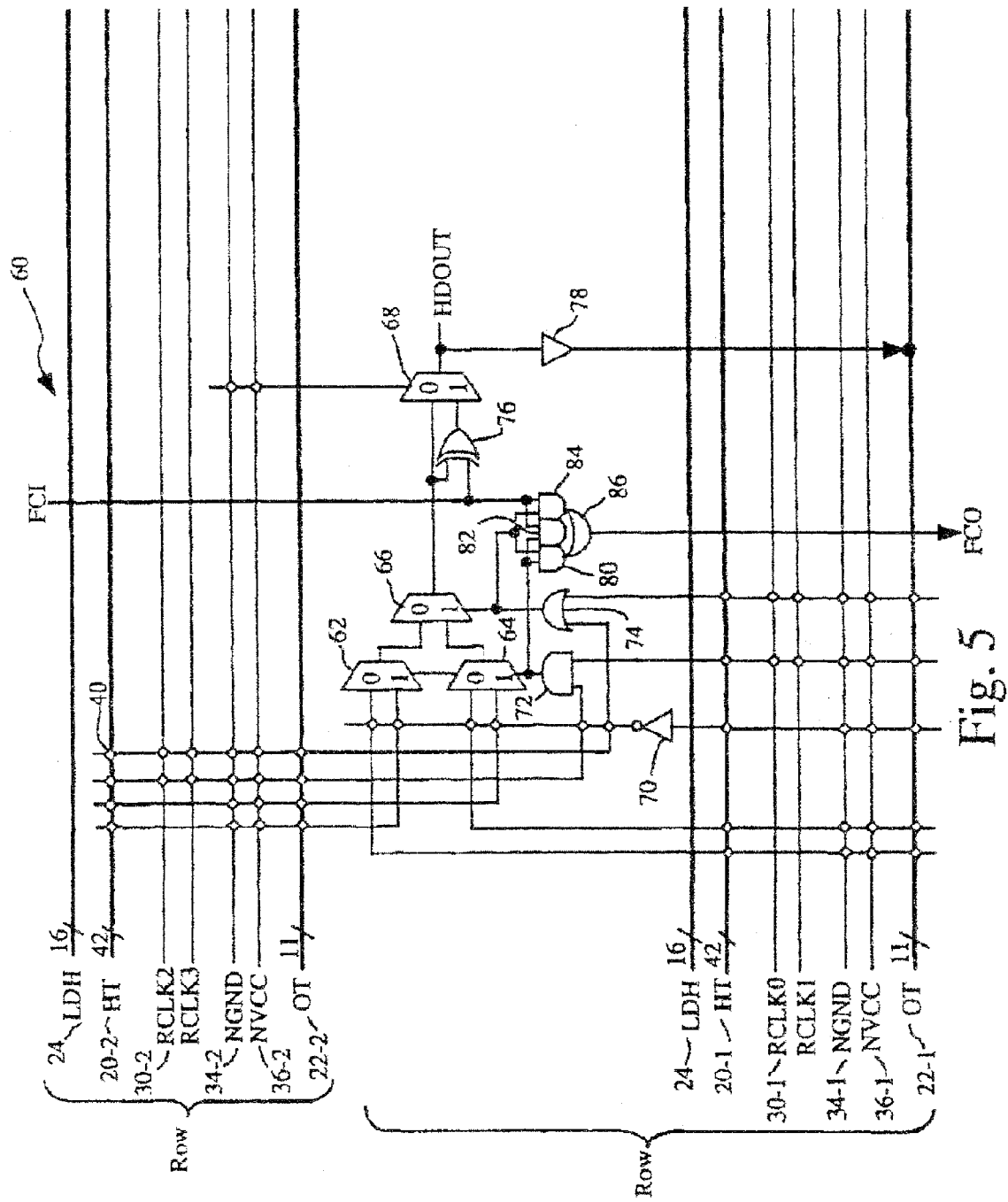
FIG. 5 illustrates a logic module according to the present invention.

FIG. 5 illustrates a logic module 60 according to the present invention. Logic module 60 is combinatorial logic unit and includes first, second, third and fourth multiplexers 62, 64, 66, and 68, each having first and second data inputs, an output, and a select input.

A first data input to multiplexers 62 and 64 may be programmably connected to the horizontal routing channel 20-1, output routing tracks 22-1, or potential 34-1 or 36-2 associated with the row of logic clusters 12 in which the logic module 60 is disposed. A second data input to multiplexers 62 and 64 may be programmably connected to the horizontal routing channel 20-2, output routing tracks 22-2, or potential 34-2 or 36-2 associated with the row of logic clusters 12 directly above the row of logic clusters 12 in which the logic module 60 is disposed. Both first and second data inputs to multiplexers 62 and 64 may otherwise be programmably connected through an inverter 70 to the horizontal routing channel 20-1, output routing racks 22-1, or potential 34-1 or 36-1.

Multiplexers 62 and 64 have a common select input coupled to the output of a two-input AND gate 38, and the outputs of multiplexers 62 and 64 form the first and second data inputs of multiplexer 66, respectively. The select input of multiplexer 66 is connected to the output of a two-input OR gate 74, and the output of multiplexer 66 forms the first data input of multiplexer 68. The second data input of multiplexer 36 is formed by the output of a two-input exclusive-OR (XOR) gate 76 having a first input connected to the output of multiplexer 66 and a second input connected to a fast carry input (FCI) signal. The select input of multiplexer 68 may be programmably connected to the potential 34-2 or 36-2. The output of multiplexer 36 HDOUT forms the output of the logic module 20. The signal HDOUT is buffered by buffer 78 and hardwired to at least one of the output routing tracks 22-1. The signal HDOUT also forms an input to a FF module 62 to be described below.

A first input to AND gate 72 may be programmably connected to the horizontal routing channel 20-1, routed clock pair 30-1, output routing tracks 22-1, or potential 34-1 or 36-1. A second input to AND gate 72 may be programmably connected to the horizontal routing channel 20-2, routed clock pair 30-2, output routing tracks 22-2, or potential 34-2 or 36-2. The second input to AND gate 72 may otherwise be programmably connected through inverter 70 to the horizontal routing channel 20-1, output routing tracks 22-1, or potential 34-1 or 36-1.

A first input to OR gate 74 may be programmably connected to the horizontal routing channel 20-1, routed clock pair 30-1, output routing tracks 22-1, or potential 34-1 or 36-1. A second input to OR gate 74 may be programmably connected to the horizontal routing channel 20-2, routed clock pair 30-2, output routing tracks 22-2, or potential 34-2 or 36-2. The second input to OR gate 74 may otherwise be programmably connected through inverter 70 to the horizontal routing channel 20-1, output routing racks 22-1, or potential 34-1 or 36-1.

The outputs of AND gate 72 and OR gate 74 are also connected, along with the FCI signal, to dedicated carry propagation logic implemented by first, second and third two-input and gates 80, 82 and 84 and three input OR gate 86. The output of AND gate 72 is connected to first inputs of AND gates 80 and 82, the output of OR gate 74 is connected to a second input of AND gate 80 and a first input of AND gate 84, and the signal FCI is connected to second inputs of AND gates 82 and 84. The outputs of AND gates 80, 82 and 84 form the inputs of OR gate 86, and the output of OR gate 86 forms the fast carry output (FCO) signal. In the logic module 60, the FCI signal is the FCO signal output of the logic module 60 that is directly adjacent and above it in the same column. The FCI and FCO signals are employed to increase the rate of ripple style arithmetic functions.

Figure 6:
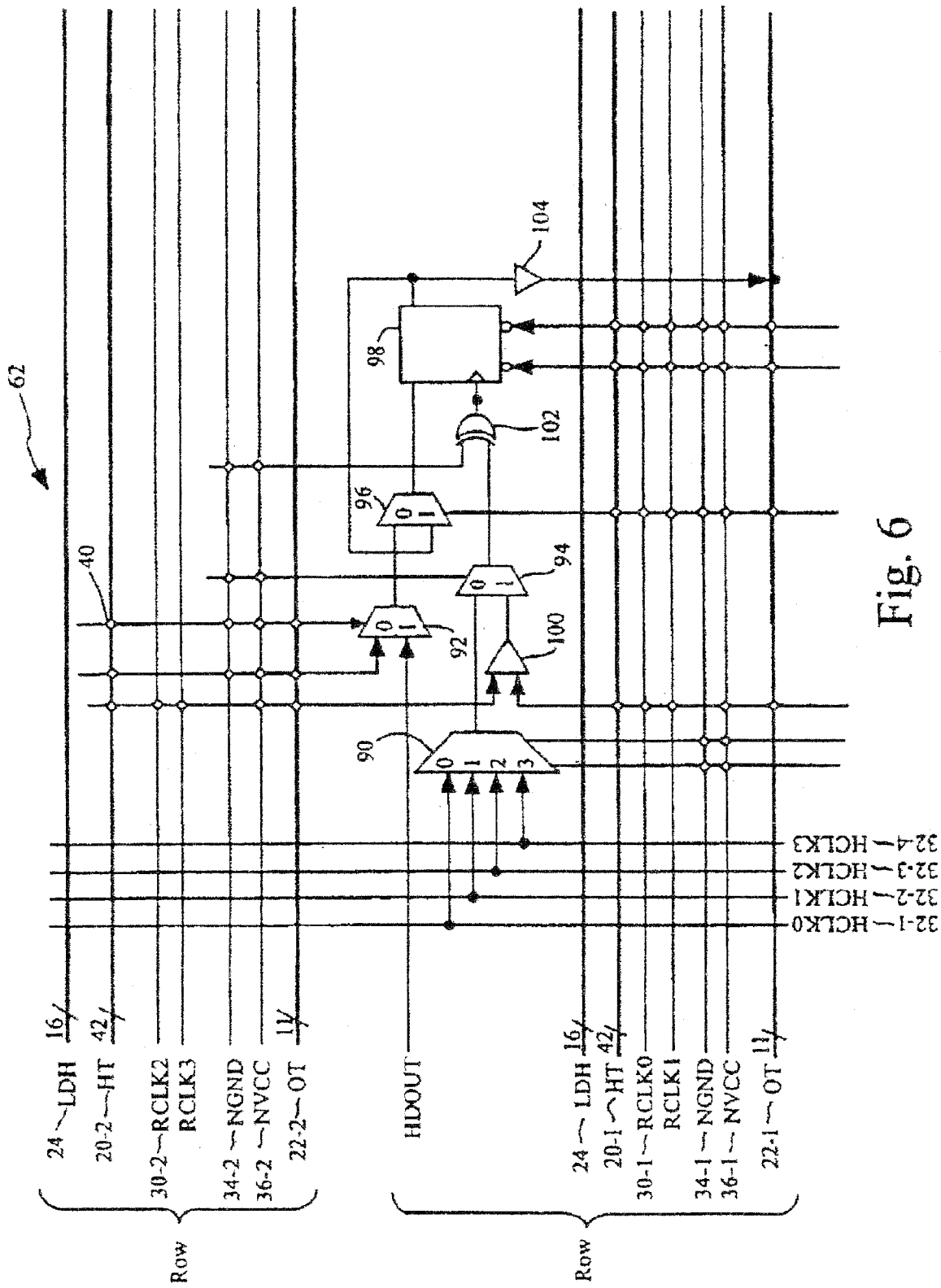
FIG. 6 illustrates a flip-flop module according to the present invention.

FIG. 6 illustrates a FF module 62 according to the present invention. FF module 62 is sequential logic unit that includes a four-input multiplexer 90 having first and second select inputs, first, second, and third two-input multiplexers 92, 94, and 96 having a single select input, and a D-type flip-flop 96.

The four inputs of four-input multiplexer 90 are connected to the four hardwired clock signals 32-1 through 32-4, and each of the first and second select inputs may be programmably connected to a potential 34-1 or 36-1 associated with the row of logic clusters 12 in which the FF module 62 is disposed.

First two-input multiplexer 64 has a first data input that may be programmably connected to the horizontal routing channel 20-2, output routing tracks 22-2, or potential 34-2 or 36-2 associated with the row of logic clusters 12 directly above the row of logic clusters 12 in which the FF module 62 is disposed, a second data input connected to a signal HDOUT, and a select signal that may be programmably connected to the horizontal routing channel 20-2, output routing tracks 22-2, or potential 34-2 or 36-2.

Second two-input multiplexer 94 has a first data input connected to the output of the four-input multiplexer 90, and a second data input that may be programmably connected through a buffer 100 to the horizontal routing channel 20-1, routed clock pair 30-1, output routing tracks 22-1, or potential 36-1, or to the horizontal routing channel 20-2, routed clock pair 30-2, output routing tracks 22-2, or potential 36-2. Second two-input multiplexer 94 has a select input that may be programmably connected to potential 34-1 or 36-1.

Third two-input multiplexer 96 has a first data input connected to the output of the first two-input multiplexer 92, a second data input connected to the output of the D-type flip-flop 70, and a select input that may be programmably connected to the horizontal routing channel 20-1, routed clock pair 30-1, output routing tracks 22-1, or potential 34-1 or 36-1.

D-type flip-flop 70 has a data input connected to the output of third two-input multiplexer 68, a clock input connected to the output of a two-input exclusive-OR gate 102 having a first input connected to the output of the second two-input multiplexer 66 and a second input that may be programmably connected to the potential 34-2 or 36-2, active low clear and present inputs that may be programmably connected to the horizontal routing channel 20-1, routed clock pair 30-1, output routing tracks 22-1, or potential 34-1 or 36-1, and an output buffered by the buffer 104 that is hardwired to at least one of the output routing tracks 22-1.

Figure 7:
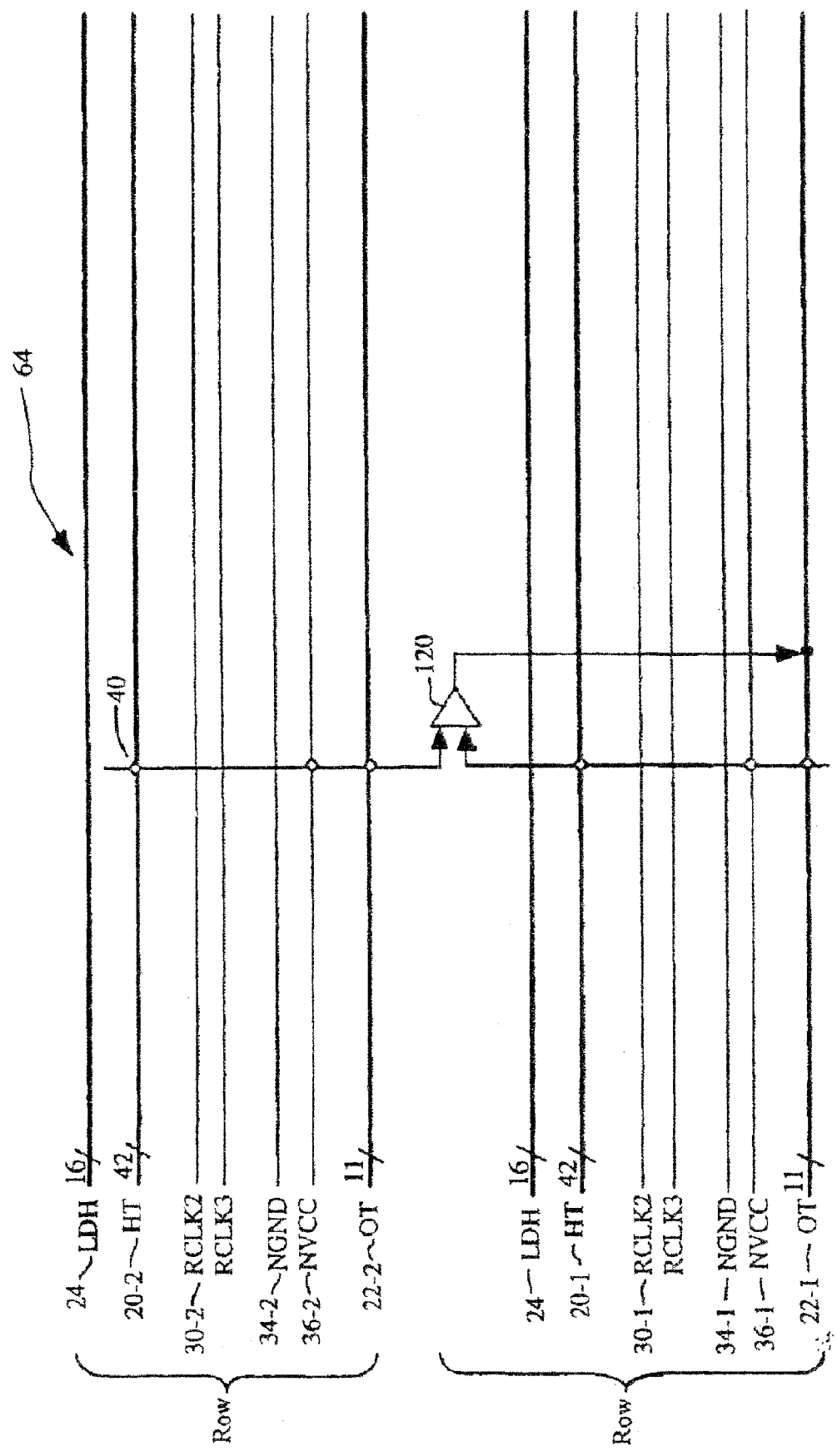
FIG. 7 illustrates the buffer module according to the present invention.

FIG. 7 illustrates the buffer module 64 according to the present invention. The buffer module 64 includes a buffer 120 having an input that may be programmably connected to either the horizontal routing channel 20-1, output routing tracks 22-1, or potential 36-1 associated with row of logic clusters 12 in which the buffer module 64 is disposed, or to the horizontal routing channel 20-2, output routing tracks 22-2, or potential 36-2 associated with row of logic clusters 12 directly above the row of logic clusters 12 in which the buffer module 64 is disposed. The output of the buffer 120 is hardwired to at least one of the output routing tracks 22-1.

Figure 8:
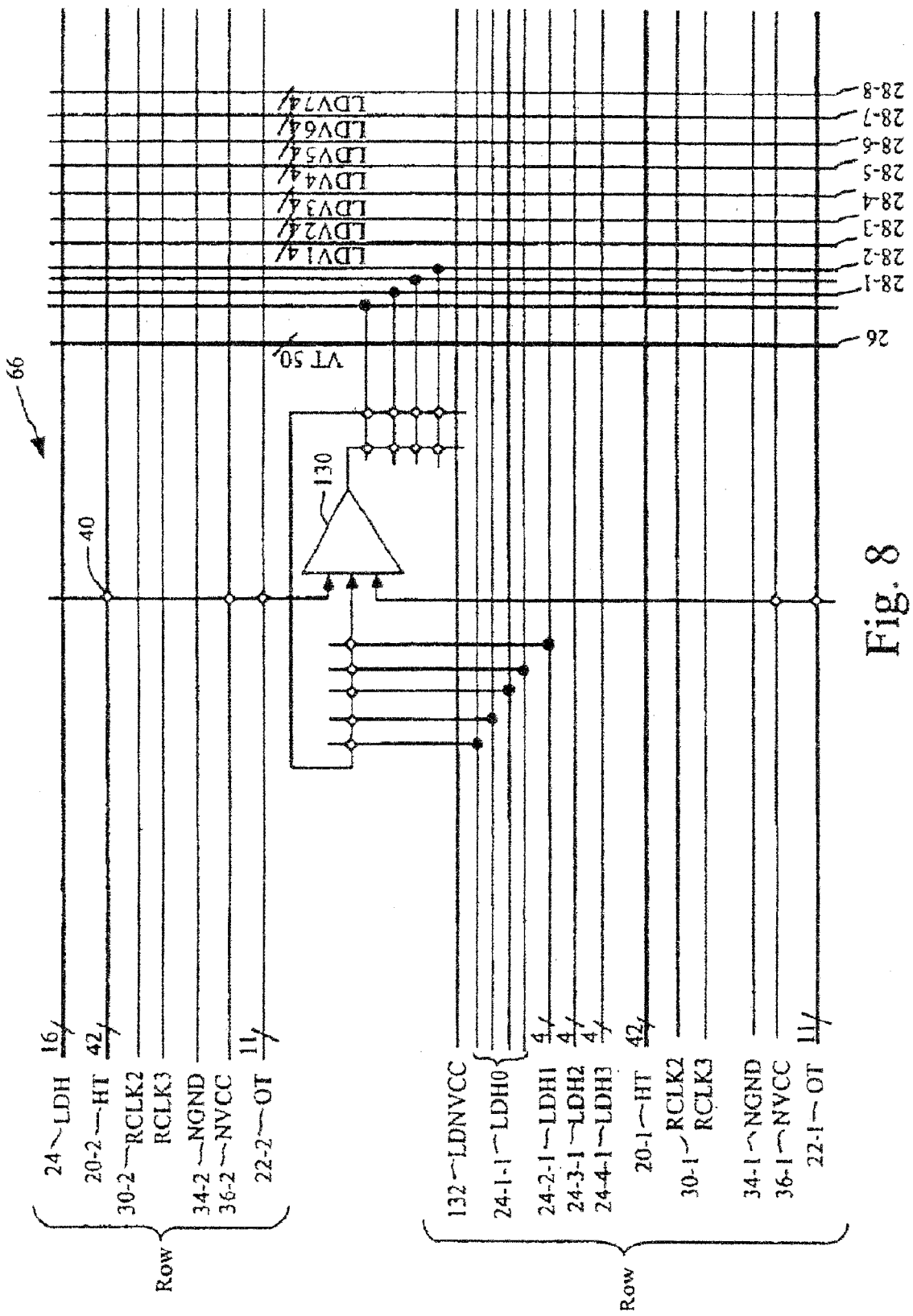
FIG. 8 illustrates a transmitter module according to the present invention.

FIG. 8 illustrates a transmitter module 66 according to the present invention. Transmitter module 66 includes a buffer 130 having an input that may be programmably connected to either the horizontal routing channel 20-1, output routing tracks 22-1, potential 36-1, or the Vcc potential LDNVCC 132 associated with the row of logic clusters 12 in which the transmitter module 66 is disposed, or to the horizontal routing channel 20-2, output routing tracks 22-2, or potential 36-2 associated with the row of logic clusters 12 directly above the row of logic clusters 12 in which the transmitter module 66 is disposed. The output of buffer 130 may be programmably connected to a horizontal highway routing track 24-1-1 or to vertical highway routing track 28-1. Additionally, the buffer 130 may be programmably connected to transfer a signal from a horizontal highway routing track 24-1-1 to vertical highway routing track 28-1 or from a vertical highway routing track 28-1 to horizontal highway routing track 24-1-1. It should be appreciated that buffer 130 may be employed to boost signal strength.

Figure 9:
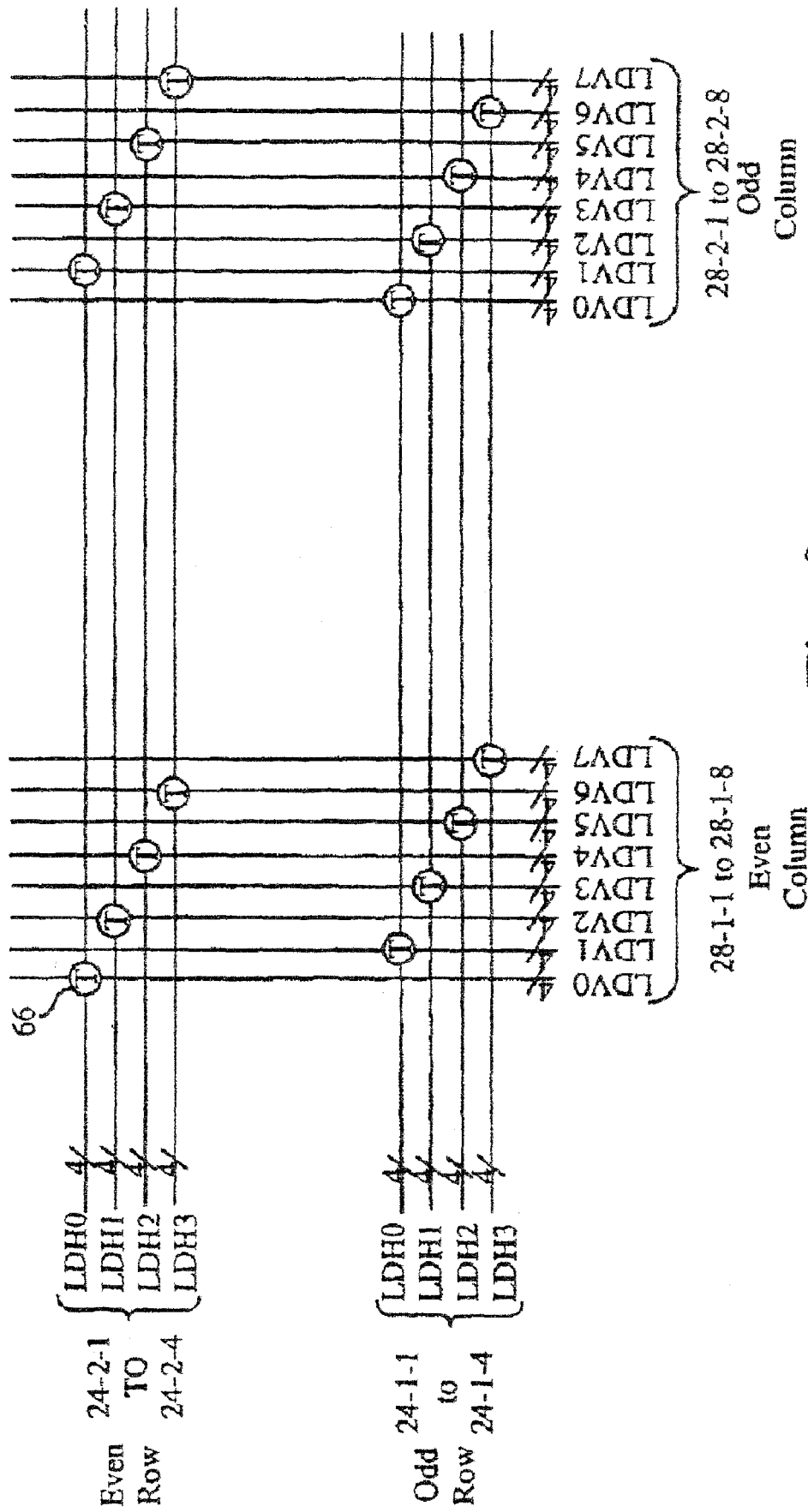
FIG. 9 illustrates the pattern of the disposition of the transmitter modules among the horizontal and vertical highway routing tracks according to the present invention.

FIG. 9 illustrates the pattern of the disposition of the transmitter modules 66 among the horizontal and vertical highway routing tracks 24 and 28 associated with adjacent rows and columns of logic clusters 12, respectively, according to the present invention. As depicted, the horizontal and vertical highway routing tracks 24 and 28 form intersections. In the disposition of the transmitter modules 66 at these intersections, each horizontal highway routing channel 24 has a transmitter module 66 disposed at the intersection with one of the vertical highway channels 28-1 and one of the vertical highway routing channels 28-2, and each vertical high routing channel 28 has a transmitter module 66 disposed at the intersection with one of the horizontal highway channels 24-1 or one of the horizontal highway routing channels 24-2.

Figure 10:
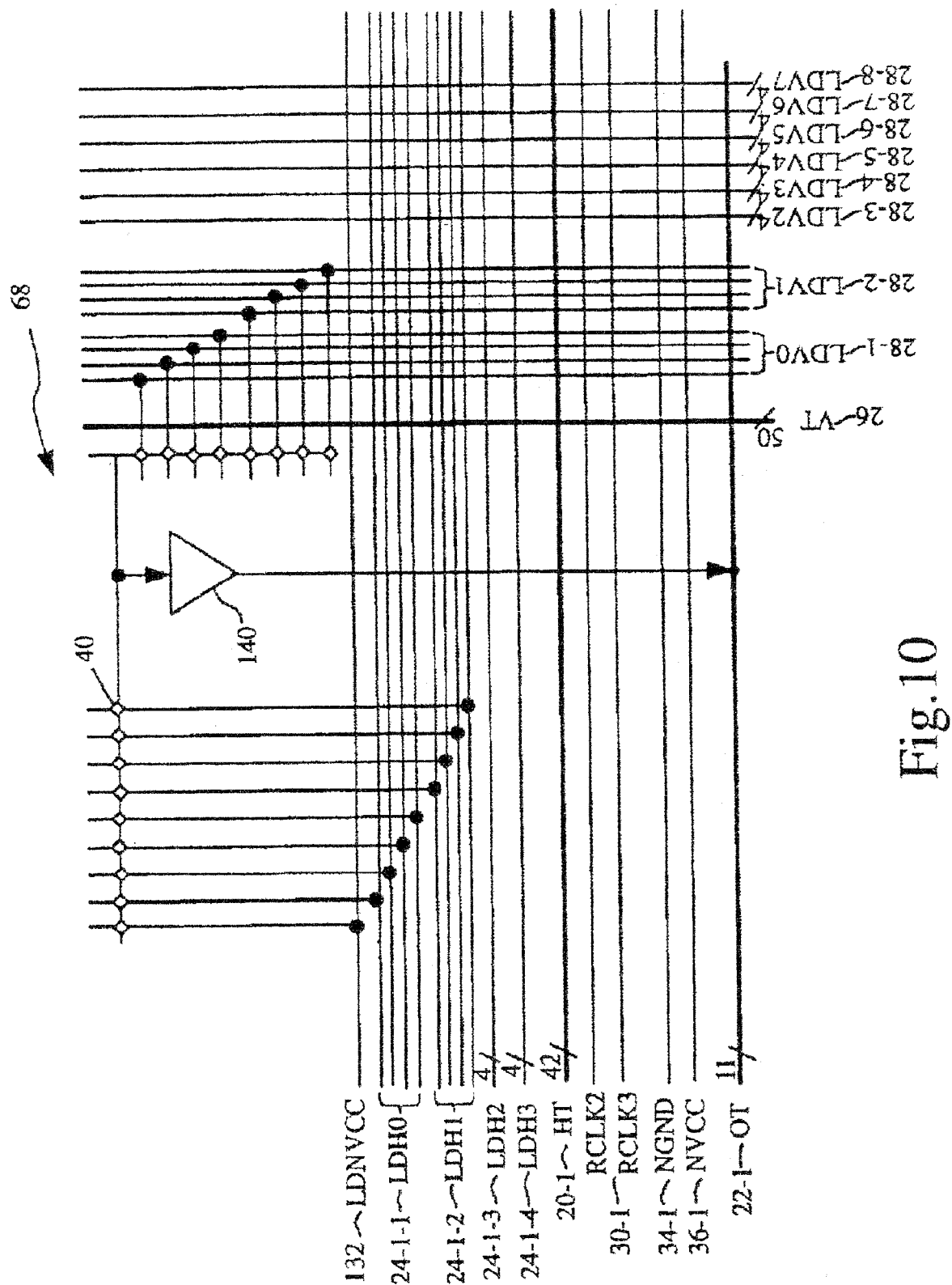
FIG. 10 illustrates a receiver module according to the present invention.

FIG. 10 illustrates receiver module 68 according to the present invention. Receive module 28 includes a buffer 140 having an input that may be programmably connected to first or second horizontal highway routing channels 24-1-1 or 24-1-2, first or second vertical highway routing channels 28-1 or 28-2, or potential 132 associated with the row or column of logic clusters 12 in which the receiver module 68 is disposed. The output of buffer 140 is hardwired to at least one of the output routing tracks 22-1.

Figure 11:
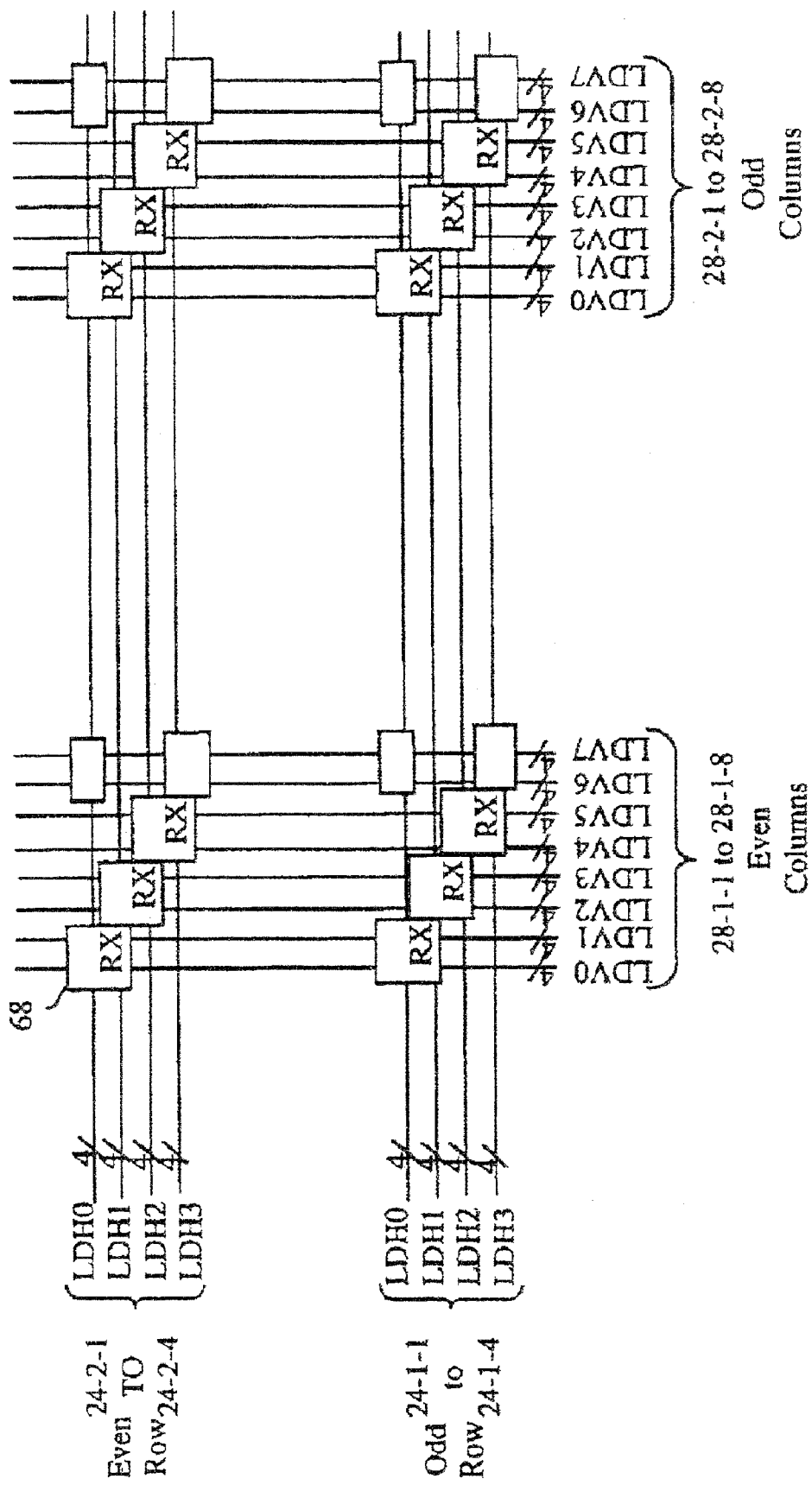
FIG. 11 illustrates the pattern of the disposition of the transmitter modules among the horizontal and vertical highway routing tracks according to the present invention.

FIG. 11 illustrates the pattern of the disposition of the transmitter modules 66 among the horizontal and vertical highway routing tracks 24 and 28 associated with adjacent rows and columns of logic clusters 12, respectively, according to the present invention. As depicted, the horizontal and vertical highway routing tracks 24 and 28 form intersections. In the disposition of the receiver modules 68 at these intersections, each horizontal highway routing channel 24 is associated with two receiver modules 68 and each vertical highway routing channel 68 is associated with a single receiver module 68.

Figure 12:
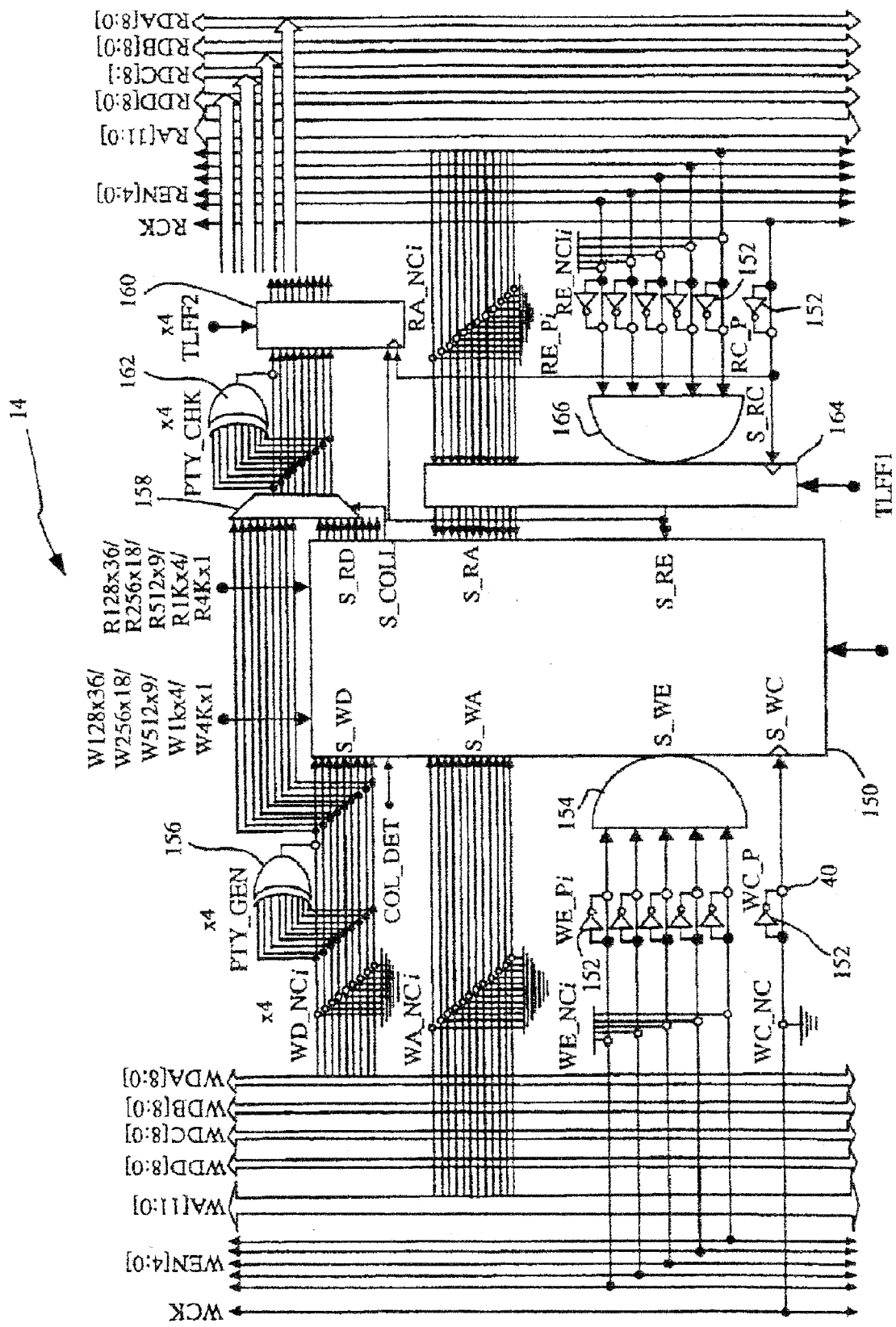
FIG. 12 illustrates a random access memory block according to the present invention.

FIG. 12 illustrates a RAM block 14 according to the present invention. In RAM block 14, the memory elements are depicted as block 150. The description of the memory elements in block 150 will not be described herein to avoid overcomplicating the disclosure and thereby obscure the present invention. The RAM block 14 is dual ported for simultaneous read and write operations. The SRAM block 150 bit organization can be configured 128 36-bit wide words, 256 18-bit wide words, 512 9-bit wide words, 1K for 4-bit wide words, or 4K 1-bit wide words. All of the words widths are stored and retrieved such that the lower order bits are at lower addresses.

Inputs to the SRAM block 150 include a write address (S_WA), a read address (S_RA), write data (S_WD), write enable (S_WE), write clock (S_WC), read enable (S_RE), block enable (BLK_EN) and collision detection enable (COL_DET). Outputs from the SRAM block 150 include read data (S_RD) and collision detection (S_COLL).

To write data to the RAM blocks 14, a 1-bit write clock (WCK) data bus, a 5-bit write enable (WEN) data bus, a 12-bit write address bus (WAD) and first through fourth 9-bit write data buses (WDA, WDB, WDC, and WDD) are provided. To read data to the RAM blocks 14 a 1-bit read clock (RCK) data bus, a 5-bit read enable (REN) data bus, a 12-bit read address bus (RAD) and first through fourth 9-bit read data buses (RDA, RDB, RDC, and RDD) are provided. It should be appreciated that the write data may be transmitted to the RAM block 14 by each of the four WD (A through D) busses, and the read data from a RAM block 14 may be transmitted to each of the four RD (A through D) busses.

The WCK bus is connected to the S_WC input of the SRAM block 150. The polarity of the signal on the WCK bus can be selected by programmable inverter 152 or programmably connected to ground. The five signals from the WEN bus are connected to an AND gate 154 whose output is connected to the S_WE input of the SRAM block 150. The polarity of each of the signals on the WEN bus can be selected by a programmable inverter, one of which is indicated by the reference numeral 152 or programmably tied high. The twelve signals on the WA bus are connected to the S_WA inputs of the SRAM 150. Each of these signals may be programmably connected to ground.

The nine signals on each of the four WD (A through D) buses are connected to the S_WD inputs of the SRAM block 150. Each of these signals may be programmably connected to ground. The eight lowest signals from each of the four WD (A through D) buses are also connected to the input of an exclusive-OR (XOR) gate 156 forming a parity generator. The output of the XOR gate 156 may be programmably connected to form the highest signal from each of the four WD (A through D) buses.

The nine signals from the WD (A through D) buses are also connected to the inputs of a 16:8 collision detector multiplexer 158. The nine output signals from the S_RD outputs are also connected to the inputs of the 18:9 collision detector multiplexer 158. The S_COLL output signal forms the select input to the collision detector multiplexer 174 to select either the nine WD signals or the nine RD signals. The output of the 18:9 collision detector multiplexer 158 is coupled to the input of a flip-flop 160 which can be configured as being either transparent or latched as will be described below. The output of the flip-flop 160 is coupled to the read data RD (A through D) buses. The nine output signals from the 18:9 multiplexer 158 are also connected to the input of an exclusive-OR (XOR) gate 162 forming a parity check. The output of the XOR gate 162 may be programmably connected to form the highest signal being output from the 18:9 multiplexer 158.

The RCK bus is connected to the clock input of a flip-flop 164 which can be configured as being either transparent or latched as will be described below and also to the flip-flop 160. The polarity of the signal on the RCK bus can be selected by programmable inverter 152. The five signals from the REN bus are connected to an AND gate 166 whose output is connected to a first data input of flip-flop 164. The polarity of each of the five signals on the REN bus can be selected by a programmable inverter, one of which is indicated by the reference numeral 152 or programmably tied high. The twelve signals on the WA bus are connected to second through thirteenth data inputs of flip-flop 164. Each of these signals may be programmably connected to ground. A first output of flip-flop 164 corresponding to the first data input of flip-flop 164 is connected to the S_RE input of SRAM 150 and to an enable input of flip-flop 160. Second through thirteenth data outputs of flip-flop 164 corresponding to the second through thirteenth data inputs of flip-flop 164 are connected to the S_RA inputs of SRAM 150.

The flip-flops 160 and 164 may be independently configured by the signals TLFF1 and TLFF1, respectively to be either transparent or latched. The flip-flop 164 synchronizes RA and REN, while 160 synchronizes the data read from the SRAM 150. The combination of flip-flops 160 and 164 may be employed in four different modes.

When flip-flops 160 and 164 are both transparent, the read operation is asynchronous. This mode does not require a RCK signal and the RCK signal is implicitly tied off. The data from the RA appears at RD when all RENs are high.

When flip-flop 160 is latched and flip-flop 164 is transparent, the read operation is a synchronous one-stage pipeline. At the active edge of RCK, when all RENs are high, the data from the RA appears at RD. The actual memory access time is included with the setup time of RA and REN, and the read time of the data is minimal with respect to RCK.

When flip-flop 160 is transparent and flip-flop 164 is latched, the read operation is a synchronous one-stage pipeline. At the active edge of RCK, when all RENs are high, the data from the RA appears at RD. The setup time of RA and REN are minimal with respect to RCK. The actual memory access time is included with the read time.

When flip-flops 160 and 164 are both latched, the read operation is a synchronous two-stage pipeline. Two active RCK cycles are needed to propagate data from the RA to RD. The first RCK cycle sets up the RA and REN, and the second RCK cycle accesses the memory to set up the read RD.

Figure 13:
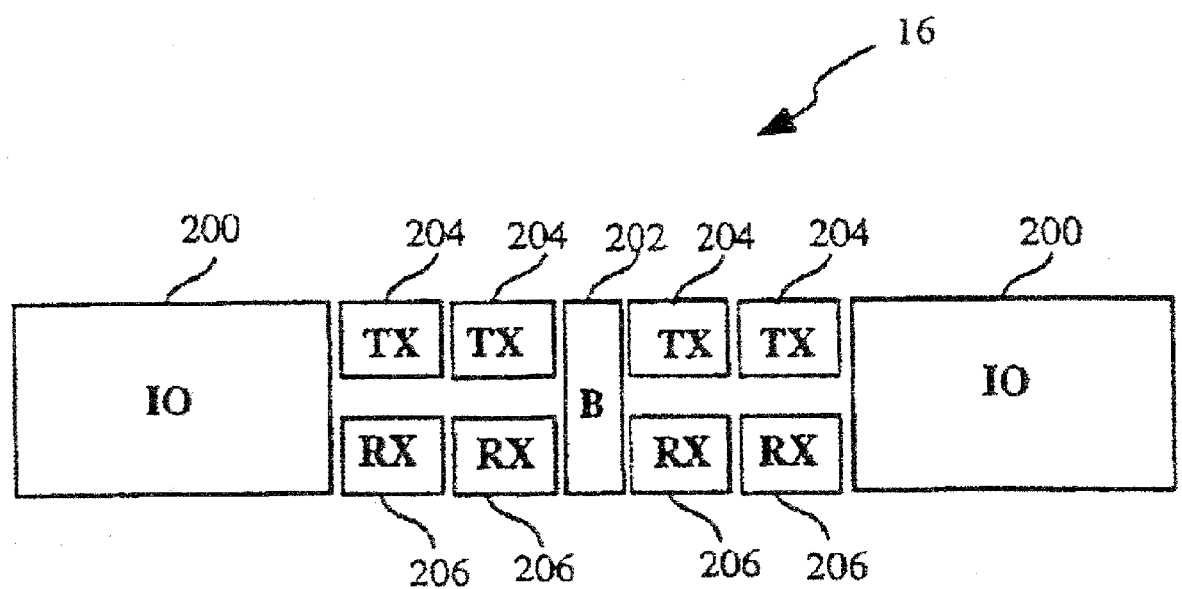
FIG. 13 illustrates a block diagram of an I/O cluster according to the present invention.

FIG. 13 illustrates a block diagram of an I/O cluster 16 according to the present invention. I/O cluster 16 includes first and second I/O modules 200, buffer module 202, first through fourth transmitter modules 204, and first through fourth receiver modules 204. The buffer, transmitter, and receiver modules 202, 204, and 206, respectively, are like those depicted in FIGS. 7, 8, 10, and will not be disclosed herein to avoid overcomplicating the disclosure and thereby obscure the present invention.

Figure 14:
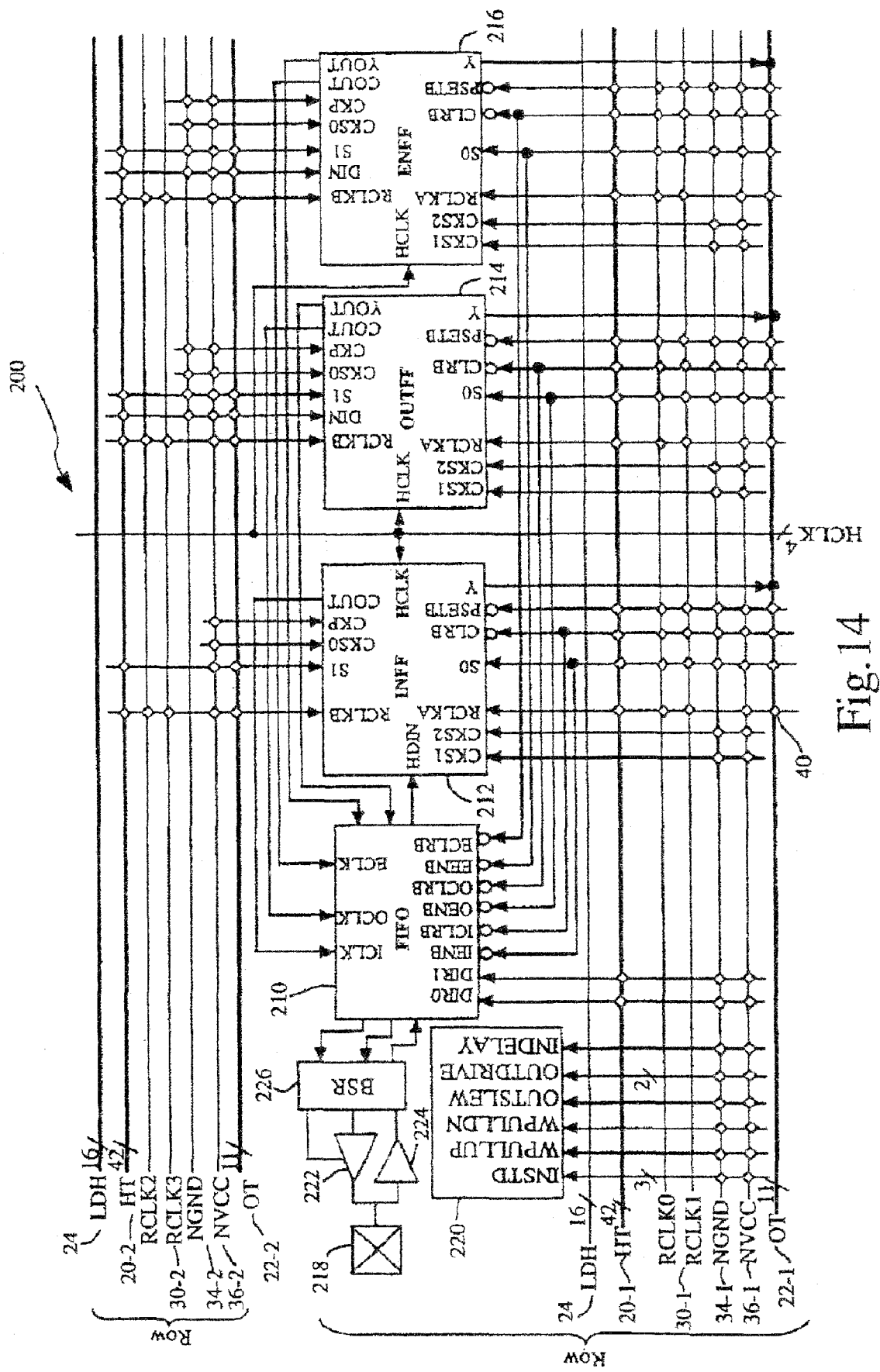
FIG. 14 illustrates a block diagram of an I/O module according to the present invention.

FIG. 14 illustrates a detailed block diagram of an I/O module 200 according to the present invention. The I/O module includes a FIFO 210, an input flip-flop (INFF) 212, an output flip-flop (OUTFF) 214, and an enable flip-flop (ENFF) 216. An I/O pad 218, which may be placed in any of several different operating modes by an I/O options module 220, and is associated with each I/O module 200 is coupled to input and output buffers 222 and 224. A boundary scan register (BSR) module 226 is coupled to the input and output buffers 222 and 224 and to FIFO 210. The implementation of a BSR 226 and FIFO 210 are well within the level of skill of those of ordinary skill in the art and will not be described herein to avoid overcomplicating the disclosure and thereby obscure the present invention. It should be appreciated that the FIFO can buffer input data, output data, output enable or be bypassed.

The inputs of I/O options module 220 may be programmably connected to potential 34-1 or 34-2 associated with the row of I/O clusters 16 in which the I/O module 200 is disposed to provide to the output buffer 222 hot insertion and 3.3 volt tolerance, a programmably slew rate, weak pull-up or pull-down circuits, and four different drive strengths, and to the input buffer 224 to provide an input delay to guarantee a zero hold time for input signals registered within the I/O.

The FIFO module 210 includes inputs DIR0, DIR1, IENB, ICRB, OENB, OCRB, EENB, ECLRB, ICK, OCLK, and ECLK. Additionally, the FIFO module 210 has a data inputs connected to the BSR module 226, OUTFF 214 and ENFF 216, first and second data outputs connected to the BSR module 226, and a data output connected to the HDIN input of the INFF 212.

The FIFO 210 has four modes that are controlled by the inputs DIR0 and DIR1. In a first mode the FIFO 210 is off and it bypasses all signals. In a second mode the FIFO 210 will buffer the output enable, and bypass input data and output data. In a third mode the FIFO 210 will buffer output data, and will bypass input data and output enable. In a fourth mode the FIFO 210 will buffer input data and bypass output data and output enable. Each of the inputs DIR0 and DIR1 may be programmably connected to the horizontal routing channel 20-1, or potential 34-1 or 36-1. The remaining inputs to the FIFO module 210 will be described along with the inputs and outputs of INFF 212, the OUTFF 214, and ENFF 216.

INFF 212 has inputs CKS1, CKS2, RCLKA, SO, CLRB, PSETB, RCLKB, S1, CKSO, CKP, HDIN, and HCLK, and the outputs Y and COUT. Each of the inputs CKS1 and CKS2 may be programmably connected to the potential 34-1 or 36-1. RCLKA may be programmably connected to the horizontal routing channel 20-1, routed clock pair 30-1, potential 36-1, or output routing tracks 22-1. Each of the inputs S0, CLRB and PSETB may be programmably connected to the horizontal routing channel 20-1, routed clock pair 30-1, potential 34-1 or 36-1, or output routing tracks 22-1. Each of the inputs CKS0 and CKP may be programmably connected to potential 34-2 or 36-2 associated with the I/O cluster 16 that is directly above the I/O cluster 16 in which the INFF 212 is disposed. RCLKB may be programmably connected to the horizontal routing channel 20-2, routed clock pair 30-2, potential 36-2, or output routing tracks 22-2. S1 may be programmably connected to the horizontal routing channel 20-2, potential 34-2 or 36-2, or output routing tracks 22-2. Input HCLK is connected to HCLK0, HCLK1, HCLK2, and HCLK3 32-1 through 32-4, respectively. The output Y is hardwired to at least one of the output routing tracks 22-1.

OUTFF 214 has inputs CKS1, CKS2, RCLKA, SO, CLRB, PSETB, RCLKB, DIN, S1, CKSO, CKP, and HCLK, and the outputs Y, COUT and YOUT. Each of the inputs CKS1 and CKS2 may be programmably connected to potential 34-1 or 36-1. RCLKA may be programmably connected to the horizontal routing channel 20-1, routed clock pair 30-1, potential 36-1, or output routing tracks 22-1. Each of the inputs S0, CLRB and PSETB may be programmably connected to the horizontal routing channel 20-1, routed clock pair 30-1, potential 34-1 or 36-1, or output routing tracks 22-1. Each of the inputs CKS0 and CKP may be programmably connected to potential 34-2 or 36-2. RCLKB may be programmably connected to the horizontal routing channel 20-2, routed clock pair 30-2, potential 36-2, or output routing tracks 22-2. Each of the inputs DIN and S1 may be programmably connected to the horizontal routing channel 20-2, potential 34-2 or 36-2, or output routing tracks 22-2. Input HCLK is connected to HCLK0, HCLK1, HCLK2, and HCLK3 32-1 through 32-4, respectively. The output Y is hardwired to at least one of the output routing tracks 22-1.

ENFF 216 has inputs CKS1, CKS2, RCLKA, SO, CLRB, PSETB, RCLKB, DIN, S1, CKSO, CKP, and HCLK, and the outputs Y, COUT and YOUT. Each of the inputs CKS1 and CKS2 may be programmably connected to potential 34-1 or 36-1. RCLKA may be programmably connected to the horizontal routing channel 20-1, routed clock pair 30-1, potential 36-1, or output routing tracks 22-1. Each of the inputs S0, CLRB and PSETB may be programmably connected to the horizontal routing channel 20-1, routed clock pair 30-1, potential 34-1 or 36-1, or output routing tracks 22-1. Each of the inputs CKS0 and CKP may be programmably connected to potential 34-2 or 36-2. RCLKB may be programmably connected to the horizontal routing channel 20-2, routed clock pair 30-2, potential 36-2, or output routing tracks 22-2. Each of the inputs DIN and S1 may be programmably connected to the horizontal routing channel 20-2, potential 34-2 or 36-2, or output routing tracks 22-2. Input HCLK is connected to HCLK0, HCLK1, HCLK2, and HCLK3 32-1 through 32-4, respectively. The output Y is hardwired to at least one of the output routing tracks 22-1.

The SO and CLRB inputs of INFF 212, OUTFF 214, and ENFF 216, are also connected to the IENB and ICLRB, OENB and OCLRB, and EENB and ECLRB inputs of FIFO 210, respectively. The outputs COUT of INFF 212, OUTFF 214, and ENFF 216, are connected to the ICLK, OCLK, and ECLK inputs, of FIFO 210, respectively. The YOUT outputs of OUTFF 214 and ENFF 216 are connected as data inputs to the FIFO 210.

Figure 15A:
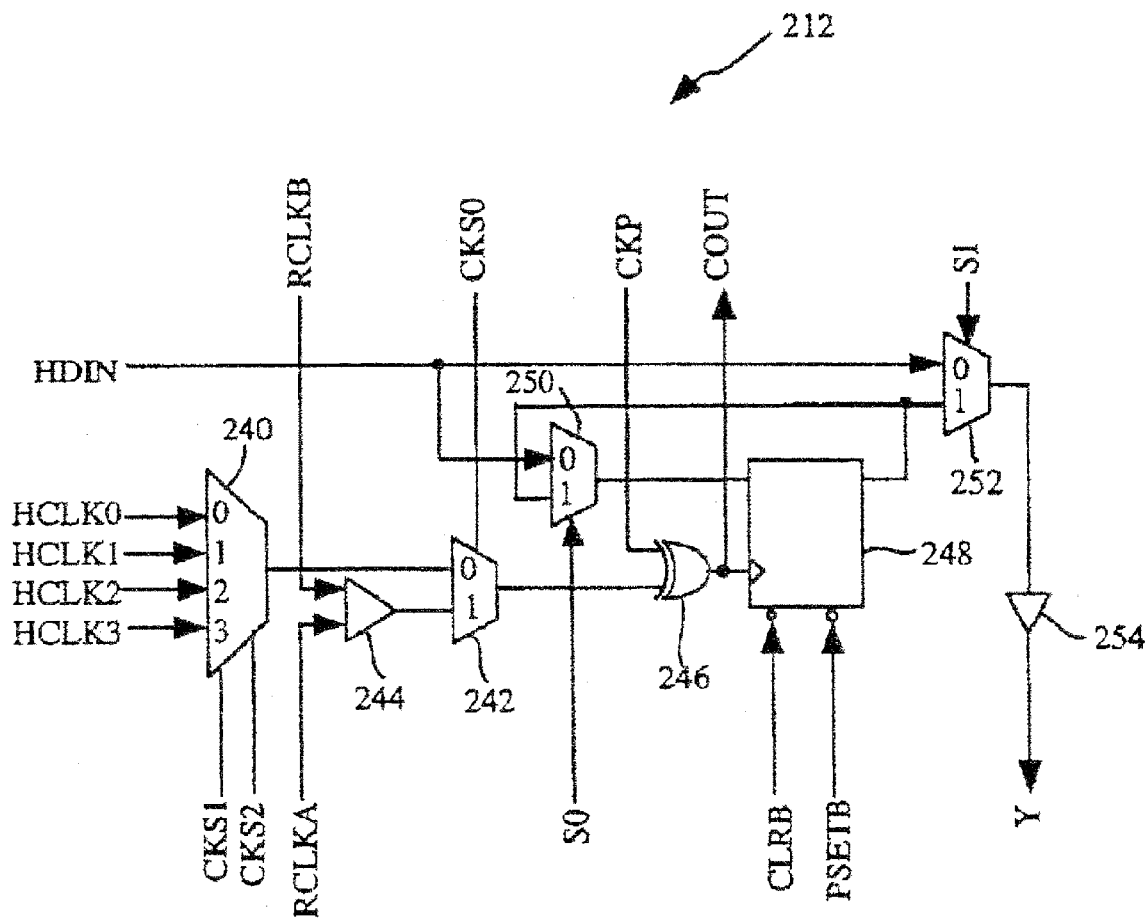
FIG. 15A illustrates an input flip-flop module according to the present invention.

FIG. 15A illustrates INFF 212 in greater detail according to the present invention. In INFF 212, a four-input multiplexer 240 has four inputs HCLK0, HCLK1, HCLK2, and HCLK3, and two selection inputs CKS1 and CKS2. The clock input selected by four-input multiplexer 240 forms an output that is connected to the first input of a two-input multiplexer 242. The second input of two input multiplexer 242 is connected to the output of a buffer 244, which buffers either the clock signal RCLKA or RCLKB. The two-input multiplexer 242 has a select input connected to the CKSO signal. The output of two input buffer 242 is connected to the first input of exclusive-OR (XOR) gate 246. The second input of XOR gate 246 is connected to the clock signals CKP. The output of XOR gate 246 is connected to the clock input of the D-type flip-flop 248. Further, the clock signal selected by the four-input multiplexer 240, buffer 244, two-input multiplexer 242, and the XOR gate 246 forms the clock output COUT. The data input of the D-type flip-flop 248 is connected to the output of a two-input multiplexer 250 having a first input connected to the data signal HDIN and a second input connected to the data output of the D-type flip-flop 248. Two-input multiplexer 250 has a select signal SO. The data input signal HDIN is also connected to the first input of a two-input multiplexer 252 along with the output of the D-type flip-flop 248 connected to a second input. The two-input multiplexer 252 has a select input S1, and the output of two-input multiplexer 252 is buffered by buffer 254 to form the output Y.

Figure 15B:
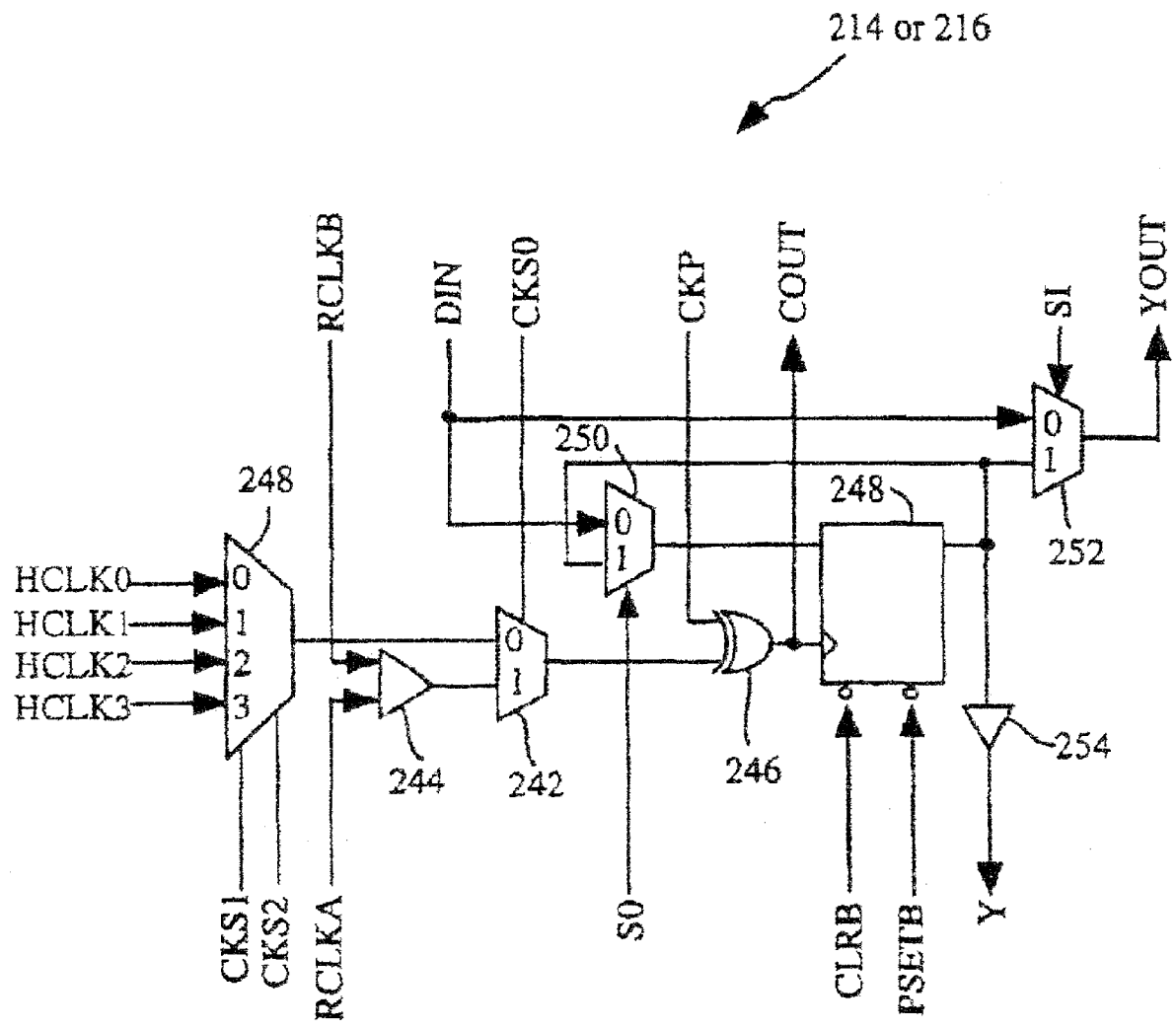
FIG. 15B illustrates an output flip-flop module and an enable flip-flop module according to the present invention.

FIG. 15B illustrates the output flip-flop 214 and enable flip-flop 216 in greater detail according to the present invention. It should be appreciated that FIG. 15B differs from FIG. 14 and FIG. 15A in only three respects. First, the data signal DIN replaces the data signal HDIN as the input to two-input multiplexers 250 and 252. Second, the output of D-type flip-flop 248 forms the buffered Y output directly rather than as the output of two-input multiplexer 252. Third, the output of two-input multiplexer 252 forms the output YOUT.

Figure 16:
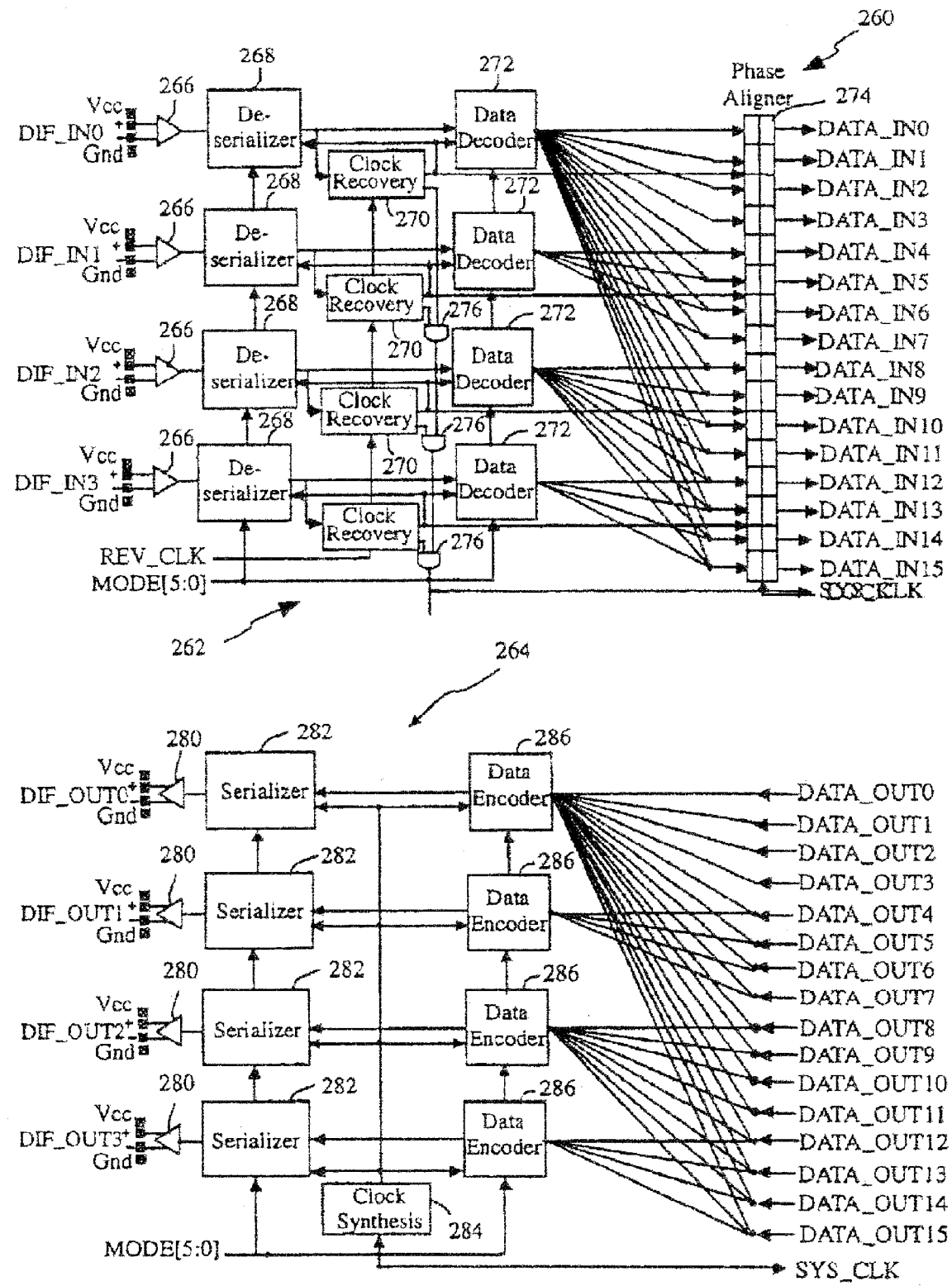
FIG. 16 illustrates a deserializer/serializer (LVDS) core suitable for use according to the present invention.

FIG. 16 illustrates a deserializer/serializer (LVDS) core 260 suitable for use according to the present invention. The LVDS core 260 can be employed to input and output signals between the I/O pads 218 and a FIFO 210. The LVDS core 260 includes circuits 262 for receiving data, and circuits 264 for transmitting data. The LVDS core 260 operates on six MODE[0:5] bits. The first two bits of the MODE[0:5] determine the operating range of the frequency of the LVDS I/O. The LVDS core 260 supports the external bandwidths of one transmit and one receive channel at 2.5 Gbps, two transmit and two receive channels at 1.25 Gbps, and four transmit and four receive channels at 622 Mbps. The second two bits of the MODE[0:5] determine the deserializing and serializing ratios of the LVDS I/O. The received channels may be deserialized into the ratios of 1:4, 1:8, and 1:16. The transmitted channels may be serialized into the ratios of 4:1, 8:1, and 16:1. The third two bits of the MODE[0:5] select a link layer option that is bypass, 4B/5B, 8B/10B, or rapid I/O.

The receiver circuitry 262 includes input buffers 266, deserializer circuits 268, clock recovery circuits 270, data decoders 272, and a phase aligner 274. Each input buffer 262 is connected to LVDS I/O that includes four I/O pads, two of which are for a differential pair, and two of which are for Vcc and ground. Each input buffer 266 has an output connected to the input of a deserializer 268 that is controlled by the MODE [0:5]. The output of each deserializer 268 is connected to the input of the clock recovery circuit 270 and the data decoder 272. Each clock recovery circuit has a reference clock as an input running at 78 Mhz, and has an output connected to the deserializer 268 and data decoder 272 pair, and the phase aligner 274. The outputs of the phase aligner 274 are connected to the FIFOs. Each clock recovery circuit 270 also has an output that is connected to an AND gate 276, which forms a part of an AND chain to provide a LOCK signal. With the clock recovery circuits 270, the embedded clock is recovered from the received channel.

The transmitter circuitry 264 includes output buffers 280, serializer circuits 282, a clock synthesis circuit 284, and data encoders 286. Each output buffer 280 is connected to a four pad LVDS I/O, and has an input that is connected to the output of the serializer 282. Each serializer 282 has an input connected to the output of a data encoder 286. The serializer 282 and data encoder 286 are both controlled by the MODE[0:5], and also are connected to the output of a clock synthesis circuit 284 having as an input a SYS_CLK running at 155 Mhz. The data encoders have inputs connected to the outputs of the FIFOs.

Figure 17:
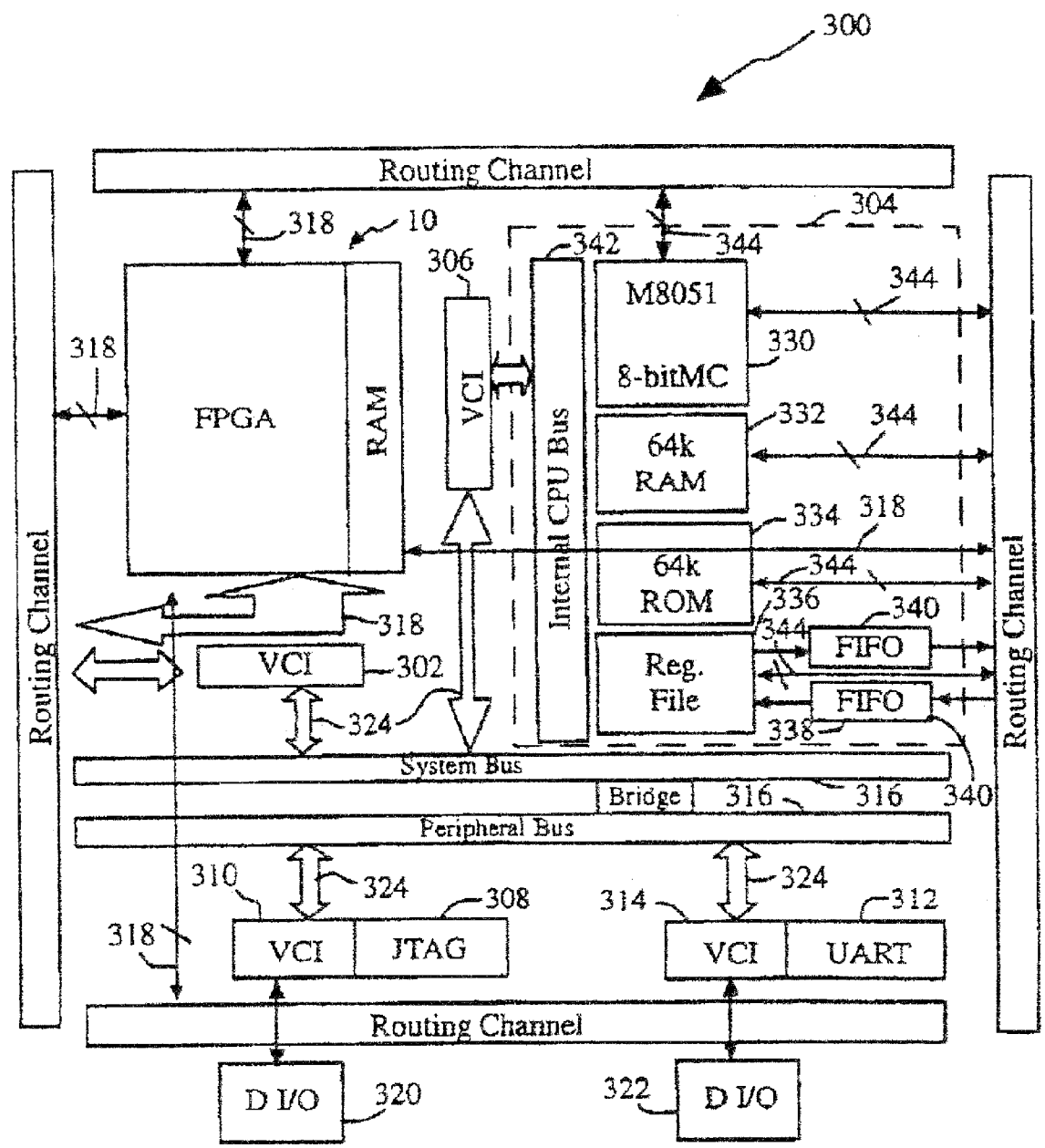
FIG. 17 illustrates a system on a chip (SOC) architecture according to the present invention.

FIG. 17 illustrates a system on a chip (SOC) architecture 300, according to the present invention, that includes an FPGA core tile 10 and associated virtual component interface (VCI) logic 302, a micro-controller 304 and associated VCI logic 306, external interface circuits JTAG 308 and UART 312 and associated VCI logic 310 and 314, respectively, and system/peripheral bus and bridge 316 and associated VCI logic (not shown). It should be understood that the I/O structures associated with the FPGA core tile 10 may not be included. To better illustrate connections within the SOC 300, the routing resources of the FPGA core tile 10 are depicted on the edges of the drawing figure connected by busses 318. It will be appreciated that these routing resources are within the FPGA core tile 10. The external interface circuits JTAG 308 and UART 312 and associated VCI logic 310 and 314 communicate external to the SOC 300 with dedicated I/O modules 320 and 322.

The VCI logic 302, 306, 310 and 314 associated with each of the components 10, 304, 308, 312, and 316 are designed to translate the signals of each of the components with which they are associated into universal signals that form a standard protocol which is understood by the remaining components in the SOC 300. Communication of the signals from a first component to a second component requires that certain of the signals from the first component be first translated to universal signals by the VCI associated with the first component. These universal signals are the translated by the VCI associated by the second component to signals on which the second component normally operates. Others of the signals from a first component will be directly connected to the second component. When the system/peripheral bus 316 is employed in the communication of translated signals from a first component to a second component using busses 324, the communication may also require translation of the universal signals onto and off of the system/peripheral bus 316. A system/peripheral bus 316 suitable for use according to the present invention has been proposed as the Advanced Microcontroller Bus Architecture (AMBA) by ARM at www.arm.com.

In a typical communication between a first component and a second component, the first component known as an initiator and the second component known as a target, perform a simple handshake and the initiator issues one or more requests that are responded to by the target. A request typically consists of an address, write data, and a few flags. A response is made by the target to the requests by the initiator in the same order as the requests were made by the initiator. A virtual component interface standard setting forth the VCI parameters, handshaking, requests and responses suitable for use according to the present invention has been proposed by the VSI Alliance™ at http:/www.vsi.org.

According to the virtual component interface standard, the handshake is first performed between an initiator and a target to synchronize the initiator and the target prior to passing a request from an initiator to the target and passing a response from the target to the initiator. Once a handshake has occurred, the requests and responses are transferred as cells between initiators and targets. These cells may be arranged into packets, and the packets may be arranged in a packet chain.

The contents of a request are partitioned into three signal groups. The first group contains an op-code to specify the type of request that is being made. The second group includes control signals for packet length and chaining. The third group includes address and data information. The op-code group includes a command field to indicate whether there is no operation, a read operation, a write operation, or a read-locked operation. The op-code field can also include flags for addressing information. The packet length and chaining group includes packet length, and of packet, and chain length and chain fixed information. The address and data group includes address information, write data, and byte enable information. The contents of a response include a response error field that indicates whether the response can be handled, and read data that is returned as a result of a read request, and an end of packet signal.

In a specific embodiment according to the present invention, a micro-controller 302 implemented by an M8051 micro-controller from Mentor Graphics, Wilsonville, Oreg. is interfaced to the FPGA core 10 in SOC 300. The micro-controller 302 includes the 8051 MC 330, random access memory (RAM) module 332, read-only memory (ROM) module 334, register file 336, and input and output FIFOs 338 and 340, respectively. The 8051 MC 330, RAM 332, ROM 334, and register file 336 are coupled to an internal CPU bus 342, which communicates with VCI 306. Busses 344 are employed by the micro-controller 302 to connect directly to the FPGA routing channels.

The 8051 micro-controller has three classes of signals, namely, processor inputs, processor outputs, and functional interconnect signals that may be translated into universal VCI signals or be direct signals.

The processor inputs that are directly connected to the routing channels of the FPGA core tile 10 include a not external access signal (NEA), a clock input from oscillator (NX1), a clock input from oscillator that is stoppable in idle mode (NX2), a reset status flags signal (RST), and first and second download mode selects (ALEI and PSEI). The processor inputs that are communicated by the VCI 306, the system/peripheral bus 316, the VCI 302 and the routing channels of the FPGA core tile 10 include four 8-bit input ports (A[7:0], B[7:0], C[7:0], and D[7:0]) that are translated to universal signals WDATA.

The processor inputs that are directly connected to the routing channels of the FPGA core tile 10 include four sets of 8-bit bidirectional control lines for port data ports (AE[7:0], BE[7:0], CE[7:0], and DE[7:0]), an address latch enable (ALE), an external program memory enable (NPSEN), a bidirectional control line for ALE and PSEN (NALEN), an oscillator disable control signal (XOFF), and an idle mode clock qualifier (IDLE). The processor inputs that are communicated by the VCI 306, the system/peripheral bus 316, the VCI 302 and the routing channels of the FPGA core tile 10 include four 8-bit output ports (OA[7:0], OB[7:0], OC[7:0], and OD[7:0]) that are translated to universal signals RDATA.

The functional interconnect signals include both input and output signals. The functional interconnect input signals that are directly connected to the routing channels of the FPGA core tile 10 include a not external special function register acknowledge (NESFR). The functional interconnect input signals that are communicated by the VCI 306, the system/peripheral bus 316, the VCI 302 and the routing channels of the FPGA core tile 10 include an 8-bit program memory data bus (MD[7:0]) and register file data inputs (FI[7:0]) that are translated to the universal signals WDATA. The functional interconnect output signals that are directly connected to the routing channels of the FPGA core tile 10 include a program memory output enable (NMOE), a program memory write strobe (NMWE), a program memory download mode (DLM), a register file output enable (NFOE), a register file write strobe (NFWE), an external special function output enable (NSFROE), and an external special function write strobe (NSFRWE). The functional interconnect output signals that are communicated by the VCI 306, the system/peripheral bus 316, the VCI 302 and the routing channels of the FPGA core tile 10 include register file data outputs (FO[7:0]) that are translated to the universal signals RDATA, and register file address lines and program memory address lines (FA[7:0] and M[15:0]) that are translated to the universal signals ADDRESS.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An integrated circuit comprising:
   a field programmable gate array (FPGA) core having logic clusters and static random access memory modules, the FPGA core having programmable routing resources;
   a system bus configured to convey signals within the integrated circuit;
   a FPGA virtual component interface translator coupled to the FPGA core and to the system bus, the FPGA virtual component interface translator configured to translate signals from the FPGA core in a first protocol to the system bus in a second protocol, and from the system bus in the second protocol to the FPGA core in the FPGA core;
   a microcontroller bus;
   a microcontroller coupled to the microcontroller bus and to the programmable routing resources;
   a microcontroller virtual component interface translator coupled to the microcontroller bus and the system bus, the microcontroller virtual component interface translator configured to translate signals from the system bus in the second protocol to the microprocessor bus in a third protocol, and from the microprocessor bus in the third protocol to the system bus in the second protocol;
   programmable routing resources coupled to the FPGA core and to the microcontroller and configured to allow a plurality of programmable connections between the FPGA core and the microcontroller;
   a peripheral bus communicating with the system bus;
   a first dedicated I/O module; and
   a first peripheral virtual component interface translator coupled to the first dedicated I/O module through routing resources and to and the peripheral bus, the first peripheral virtual component interface translator configured to translate signals from a fourth protocol in the first dedicated I/O module to the second protocol on the system bus; and to translate signals from the second protocol on the system bus to the fourth protocol in first dedicated I/O module.

2. The integrated circuit of claim 1, further comprising:
   a random access memory coupled to the microcontroller through the microcontroller bus and to the programmable routing resources;
   a program-store memory coupled to the microcontroller through the microcontroller bus and to the programmable routing resources; and
   a register file coupled to the microcontroller through the microcontroller bus and to the programmable routing resources.

3. The integrated circuit of claim 1 further comprising a JTAG port coupled to the first dedicated I/O module.

4. The integrated circuit of claim 1 further comprising:
   a second dedicated I/O module; and
   a second peripheral virtual component interface translator coupled to the second dedicated I/O module through routing resources and to and the peripheral bus, the second peripheral virtual component interface translator configured to translate signals from a fifth protocol in the second dedicated I/O module to the second protocol on the system bus; and to translate signals from the second protocol on the system bus to the fifth protocol in the second dedicated I/O module.

5. The integrated circuit of claim 4 further comprising a UART coupled to the first dedicated I/O module.

6. The integrated circuit of claim 1 further comprising:
   a first FIFO coupled between the register file and the routing resources; and
   a second FIFO coupled between the routing resources and the register file.

7. The integrated circuit of claim 1 wherein the plurality of programmable connections further comprise direct connections between the FPGA core and the microcontroller, and the integrated circuit is configurable to provide direct connections between the FPGA core and the microcontroller and connections between the FPGA core and the microcontroller through the FPGA virtual component interface and the microcontroller virtual component interface.

8. An integrated circuit comprising:
   a field programmable gate array (FPGA) core having logic clusters, static random access memory modules and routing resources;
   an FPGA virtual component interface translator coupled to the field programmable gate array core and configured to translate data from a first protocol to a second protocol for use by the FPGA core;
   a microcontroller;
   a microcontroller virtual component interface translator coupled between the FPGA core and the microcontroller and configured to translate data received in the second protocol from the FPGA core into data in a third protocol for use by the microcontroller;
   a system bus connected to the field programmable gate array virtual component interface translator and to the microcontroller virtual component interface translator; and direct connection between the microcontroller and the routing resources of the field programmable gate array core.

9. The integrated circuit of claim 8 wherein:

the plurality of programmable connections further comprise direct connections between the FPGA core and the microcontroller, and the integrated circuit is configurable to provide direct connections between the FPGA core and the microcontroller and connections between the FPGA core and the microcontroller through the FPGA virtual component interface and the microcontroller virtual component interface.

* * * * *